(12) United States Patent
Floyd-Jones et al.

(10) Patent No.: US 11,634,126 B2
(45) Date of Patent: Apr. 25, 2023

(54) APPARATUS, METHODS AND ARTICLES TO FACILITATE MOTION PLANNING IN ENVIRONMENTS HAVING DYNAMIC OBSTACLES

(71) Applicant: REALTIME ROBOTICS, INC., Boston, MA (US)

(72) Inventors: William Floyd-Jones, Boston, MA (US); Bryce Willey, Boston, MA (US); George Konidaris, Boston, MA (US); Xianchao Long, Boston, MA (US)

(73) Assignee: REALTIME ROBOTICS, INC., Boston, MA (US)

( * ) Notice: Subject to any disclaimer, the term of this patent is extended or adjusted under 35 U.S.C. 154(b) by 428 days.

(21) Appl. No.: 16/883,376

(22) Filed: May 26, 2020

(65) Prior Publication Data
US 2020/0377085 A1    Dec. 3, 2020

Related U.S. Application Data

(60) Provisional application No. 62/856,548, filed on Jun. 3, 2019.

(51) Int. Cl.
*B60W 30/095* (2012.01)
*B60W 30/09* (2012.01)
(Continued)

(52) U.S. Cl.
CPC ........ *B60W 30/0956* (2013.01); *B60W 30/09* (2013.01); *B60W 30/12* (2013.01);
(Continued)

(58) Field of Classification Search
CPC ............. B60W 30/09; B60W 30/0956; B60W 60/0015; B60W 60/00274; B60W 60/00276; B60W 2552/30; B60W 2552/53
See application file for complete search history.

(56) References Cited

U.S. PATENT DOCUMENTS 4,862,373 A    8/1989    Meng
4,949,277 A    8/1990    Trovato et al.
(Continued)

FOREIGN PATENT DOCUMENTS

EP    1901150 A1    3/2008
EP    2306153 A2    4/2011
(Continued)

OTHER PUBLICATIONS

Final Office Action dated Aug. 2, 2021 for U.S. Appl. No. 16/240,086 in 66 pages.
(Continued)

*Primary Examiner* — Anshul Sood
(74) *Attorney, Agent, or Firm* — Cozen O'Connor

(57) ABSTRACT

A motion planner performs motion planning with collision assessment, using a motion planning lattice that represents configuration states of a primary agent (e.g., autonomous vehicle) as nodes and transitions between states as edges. The system may assign cost values to edges, the cost values representing probability or likelihood of collision for the corresponding transition. The cost values may additionally or alternatively represent a severity of collision, for example generated via a parametric function with two or more parameters and one or more weights. A primary agent and/or dynamic obstacles may be represented as respective oriented bounding boxes. Some obstacles (e.g., road markings, edge of road) may be represented as curves. A trajectory of a primary agent and/or dynamic obstacle may be represented by respective sets of fitted polynomial functions, edges on the planning graph, which represent transitions in states of the primary agent, the system sets value representing a probability of collision, and optionally representing a severity of the collision. The system then causes the actuator system of the primary agent to implement a motion plan with (Continued)

the applicable identified path based at least in part on the optimization.

12 Claims, 8 Drawing Sheets

(51) Int. Cl.
  *B60W 30/12* (2020.01)
  *B60W 60/00* (2020.01)
(52) U.S. Cl.
  CPC .. *B60W 60/0015* (2020.02); *B60W 60/00276* (2020.02); *B60W 2552/30* (2020.02); *B60W 2552/50* (2020.02); *B60W 2552/53* (2020.02)

(56) References Cited

U.S. PATENT DOCUMENTS

| | | | |
|---|---|---|---|
| 5,347,459 | A | 9/1994 | Greenspan et al. |
| 5,544,282 | A | 8/1996 | Chen et al. |
| 6,004,016 | A | 12/1999 | Spector |
| 6,049,756 | A | 4/2000 | Libby |
| 6,089,742 | A | 7/2000 | Warmerdam et al. |
| 6,259,988 | B1 | 7/2001 | Galkowski |
| 6,493,607 | B1 | 12/2002 | Bourne et al. |
| 6,526,372 | B1 | 2/2003 | Orschel et al. |
| 6,526,373 | B1 | 2/2003 | Barral |
| 6,539,294 | B1 | 3/2003 | Kageyama |
| 7,865,277 | B1 | 1/2011 | Larson et al. |
| 8,315,738 | B2 | 11/2012 | Chang et al. |
| 8,571,706 | B2 | 10/2013 | Zhang et al. |
| 8,666,548 | B2 | 3/2014 | Lim |
| 8,825,207 | B2 | 9/2014 | Kim et al. |
| 8,855,812 | B2 | 10/2014 | Kapoor |
| 8,972,057 | B1 | 3/2015 | Freeman et al. |
| 9,102,055 | B1 | 8/2015 | Konolige et al. |
| 9,280,899 | B2 | 3/2016 | Biess et al. |
| 9,632,502 | B1 | 4/2017 | Levinson et al. |
| 9,645,577 | B1 | 5/2017 | Frazzoli et al. |
| 9,687,982 | B1 | 6/2017 | Jules et al. |
| 9,687,983 | B1 | 6/2017 | Prats |
| 9,731,724 | B2 | 8/2017 | Yoon |
| 9,981,383 | B1 | 5/2018 | Nagarajan |
| 10,035,266 | B1 | 7/2018 | Kroeger |
| 10,099,372 | B2 | 10/2018 | Vu et al. |
| 10,124,488 | B2 | 11/2018 | Lee et al. |
| 10,131,053 | B1 | 11/2018 | Sampedro et al. |
| 10,430,641 | B2 | 10/2019 | Gao |
| 10,705,528 | B2 | 7/2020 | Wierzynski et al. |
| 10,723,024 | B2 | 7/2020 | Konidaris et al. |
| 10,782,694 | B2 | 9/2020 | Zhang et al. |
| 2002/0074964 | A1 | 6/2002 | Quaschner et al. |
| 2005/0071048 | A1 | 3/2005 | Watanabe et al. |
| 2005/0216181 | A1 | 9/2005 | Estkowski et al. |
| 2006/0235610 | A1 | 10/2006 | Ariyur et al. |
| 2006/0247852 | A1 | 11/2006 | Kortge et al. |
| 2007/0112700 | A1 | 5/2007 | Den et al. |
| 2008/0125893 | A1 | 5/2008 | Tilove et al. |
| 2008/0234864 | A1 | 9/2008 | Sugiura et al. |
| 2009/0192710 | A1 | 7/2009 | Eidehall et al. |
| 2009/0326711 | A1 | 12/2009 | Chang et al. |
| 2009/0326876 | A1 | 12/2009 | Miller |
| 2010/0235033 | A1 | 9/2010 | Yamamoto et al. |
| 2011/0066282 | A1 | 3/2011 | Bosscher et al. |
| 2011/0153080 | A1 | 6/2011 | Shapiro et al. |
| 2012/0010772 | A1 | 1/2012 | Pack et al. |
| 2012/0083964 | A1 | 4/2012 | Montemerlo et al. |
| 2012/0215351 | A1 | 8/2012 | Mcgee et al. |
| 2014/0012419 | A1 | 1/2014 | Nakajima |
| 2014/0025201 | A1 | 1/2014 | Ryu et al. |
| 2014/0025203 | A1 | 1/2014 | Inazumi |
| 2014/0067121 | A1 | 3/2014 | Brooks et al. |
| 2014/0121833 | A1 | 5/2014 | Lee et al. |
| 2014/0147240 | A1 | 5/2014 | Noda et al. |
| 2014/0249741 | A1 | 9/2014 | Levien et al. |
| 2014/0251702 | A1 | 9/2014 | Berger et al. |
| 2014/0309916 | A1 | 10/2014 | Bushnell |
| 2015/0051783 | A1 | 2/2015 | Tamir et al. |
| 2015/0134111 | A1 | 5/2015 | Nakajima |
| 2015/0261899 | A1 | 9/2015 | Atohira et al. |
| 2015/0266182 | A1 | 9/2015 | Strandberg |
| 2016/0001775 | A1 | 1/2016 | Wilhelm et al. |
| 2016/0107313 | A1 | 4/2016 | Hoffmann et al. |
| 2016/0112694 | A1 | 4/2016 | Nishi et al. |
| 2016/0121487 | A1 | 5/2016 | Mohan et al. |
| 2016/0154408 | A1 | 6/2016 | Eade et al. |
| 2016/0299507 | A1 | 10/2016 | Shah et al. |
| 2016/0357187 | A1 | 12/2016 | Ansari |
| 2017/0004406 | A1 | 1/2017 | Aghamohammadi |
| 2017/0028559 | A1 | 2/2017 | Davidi et al. |
| 2017/0120448 | A1 | 5/2017 | Lee et al. |
| 2017/0123419 | A1 | 5/2017 | Levinson et al. |
| 2017/0132334 | A1 | 5/2017 | Levinson et al. |
| 2017/0146999 | A1 | 5/2017 | Cherepinsky et al. |
| 2017/0157769 | A1 | 6/2017 | Aghamohammadi et al. |
| 2017/0168485 | A1 | 6/2017 | Berntorp et al. |
| 2017/0168488 | A1 | 6/2017 | Wierzynski et al. |
| 2017/0193830 | A1 | 7/2017 | Fragoso et al. |
| 2017/0210008 | A1 | 7/2017 | Maeda |
| 2017/0305015 | A1 | 10/2017 | Krasny et al. |
| 2018/0001472 | A1 | 1/2018 | Konidaris et al. |
| 2018/0001476 | A1 | 1/2018 | Tan et al. |
| 2018/0029233 | A1 | 2/2018 | Lager |
| 2018/0074505 | A1 | 3/2018 | Lv et al. |
| 2018/0113468 | A1 | 4/2018 | Russell |
| 2018/0136662 | A1 | 5/2018 | Kim |
| 2018/0150077 | A1* | 5/2018 | Danielson ............ G05D 1/0088 |
| 2018/0172450 | A1* | 6/2018 | Lalonde ............ G01C 21/3407 |
| 2018/0173242 | A1 | 6/2018 | Lalonde et al. |
| 2018/0222051 | A1 | 8/2018 | Vu et al. |
| 2018/0229368 | A1 | 8/2018 | Leitner et al. |
| 2018/0281786 | A1 | 10/2018 | Oyaizu et al. |
| 2019/0143518 | A1 | 5/2019 | Maeda |
| 2019/0163191 | A1 | 5/2019 | Sorin et al. |
| 2019/0164430 | A1 | 5/2019 | Nix |
| 2019/0196480 | A1 | 6/2019 | Taylor |
| 2019/0232496 | A1 | 8/2019 | Graichen et al. |
| 2019/0262993 | A1 | 8/2019 | Cole et al. |
| 2019/0293443 | A1 | 9/2019 | Kelly et al. |
| 2019/0391597 | A1 | 12/2019 | Dupuis |
| 2020/0069134 | A1 | 3/2020 | Ebrahimi Afrouzi et al. |
| 2020/0097014 | A1* | 3/2020 | Wang .................. G06Q 10/047 |
| 2020/0331146 | A1 | 10/2020 | Vu et al. |
| 2020/0338730 | A1 | 10/2020 | Yamauchi et al. |
| 2020/0338733 | A1 | 10/2020 | Dupuis et al. |
| 2020/0353917 | A1* | 11/2020 | Leitermann .......... G05D 1/0214 |
| 2020/0368910 | A1 | 11/2020 | Chu et al. |

FOREIGN PATENT DOCUMENTS

| | | |
|---|---|---|
| EP | 3250347 A1 | 12/2017 |
| EP | 3725472 A1 | 10/2020 |
| JP | 11296229 A | 10/1999 |
| JP | 2002073130 A | 3/2002 |
| JP | 2003127077 A | 5/2003 |
| JP | 2006224740 A | 8/2006 |
| JP | 2008065755 A | 3/2008 |
| JP | 2010061293 A | 3/2010 |
| JP | 2011075382 A | 4/2011 |
| JP | 2011249711 A | 12/2011 |
| JP | 2012056023 A | 3/2012 |
| JP | 2012190405 A | 10/2012 |
| JP | 2012243029 A | 12/2012 |
| JP | 2013193194 A | 9/2013 |
| JP | 2014184498 A | 10/2014 |
| JP | 2015044274 A | 3/2015 |
| JP | 2015517142 A | 6/2015 |
| JP | 2015208811 A | 11/2015 |
| JP | 2018505788 A | 3/2018 |
| KR | 19980024584 A | 7/1998 |
| KR | 20110026776 A | 3/2011 |
| KR | 20130112507 A | 10/2013 |
| KR | 20170018564 A | 2/2017 |
| KR | 20170050166 A | 5/2017 |

(56) References Cited

FOREIGN PATENT DOCUMENTS

| | | |
|---|---|---|
| KR | 20180125646 A | 11/2018 |
| TW | 201318793 A | 5/2013 |
| WO | 9924914 A1 | 5/1999 |
| WO | 2015113203 A1 | 8/2015 |
| WO | 2016122840 A1 | 8/2016 |
| WO | 2017168187 A1 | 10/2017 |
| WO | 2017214581 A1 | 12/2017 |
| WO | 2019183141 A1 | 9/2019 |
| WO | 2020040979 A1 | 2/2020 |
| WO | 2020117958 A1 | 6/2020 |

OTHER PUBLICATIONS

European Search Report issued in European Application No. 19771537.8, dated Mar. 29, 2021, 8 pages.
Final Office Action Issued in U.S. Appl. No. 16/268,290, dated Apr. 21, 2021, 58 pages.
Murray, Sean , et al., "Robot Motion Planning on a Chip", Robotics: Science and Systems, Jan. 1, 2016, 9 pages.
Rodriguez, Carlos , et al., "Planning manipulation movements of a dual-arm system considering obstacle removing", Robotics and Autonomous Systems 62 (2014), ELSEVIER, Journal homepage: www.elsevler.com/locate/robot, pp. 1816-1826.
Non-Final Office Action Issued in U.S. Appl. No. 16/240,086, dated Feb. 11, 2021, 79 pages.
Non-Final Office Action Issued in U.S. Appl. No. 16/308,693, dated May 14, 2021, 16 pages.
Notice of Allowance dated Sep. 23, 2021, for Ritchey, "Motion Planning for Autonomous Vehicles and Reconfigurable Motion Planning Processors," U.S. Appl. No. 16/615,493, 11 pages.
Notice of Allowance dated Sep. 24, 2021, for Ritchey, "Motion Planning of a Robot Storing a Discretized Environment on One or More Processors and Improved Operation of Same," U.S. Appl. No. 16/268,290, 8 pages.
Communication Pursuant to Article 94(3) EPC, issued in European Application No. 17811131.6, dated Jun. 16, 2020, 5 pages.
Extended European Search Report dated Apr. 10, 2018 for EP Application No. 16743821.7, in 9 pages.
Extended European Search Report issued in European Application No. 17811131.6, dated Apr. 24, 2019, 16 pages.
Extended European Search Report issued in European Application No. 18209405.2, dated Aug. 2, 2019, 9 pages.
First Office Action issued in Chinese No. 201680006941.3 with English translation, dated Sep. 29, 2019, 16 pages.
First Office Action issued in Japanese Patent Application No. 2017-557268, dated Aug. 7, 2018, 15 pages.
International Search Report and Written Opinion dated Jul. 29, 2020, in PCT/US2020/028343, 11 pages.
International Search Report and Written Opinion for PCT/US2019/016700 dated May 20, 2019, 14 pages.
International Search Report and Written Opinion for PCT/US2019/023031 dated Aug. 14, 2019 in 19 pages.
International Search Report and Written Opinion for PCT/US2019/064511, dated Mar. 27, 2020, 10 pages.
International Search Report and Written Opinion issued in PCT Application No. PCT/2020/034551, dated Aug. 31, 2020, 18 pages.
International Search Report and Written Opinion issued in PCT Application No. PCT/US2016/012204; dated Mar. 21, 2016, 10 pages.
International Search Report and Written Opinion issued in PCT Application No. PCT/US2017/036880; dated Oct. 10, 2017, 15 pages.
International Search Report and Written Opinion issued in PCT Application No. PCT/US2019/045270; dated Nov. 25, 2019, 11 pages.
International Search Report and Written Opinion issued in PCT/US2019/012209, dated Apr. 25, 2019, 24 pages.
International Search Report and Written Opinion, dated Jun. 23, 2020 for PCT/US2020/039193, 9 pages.
Non-Final Office Action Issued in U.S. Appl. No. 16/308,693, dated Jun. 1, 2020, 16 pages.
Non-Final Office Action Issued in U.S. Appl. No. 15/546,441, dated Sep. 17, 2019, 58 Pages.
Office Action Issued in Japanese Application No. 2018-564836, dated Dec. 3, 2019, 3 Pages.
Office Action Issued in Japanese Application No. 2018-564836, dated May 19, 2020, 3 Pages.
Or.pdf (Or | Definition of Or by Merriam-Webster, Sep. 9, 2019, https://www.merriam-webster.com/dictionary/or, pp. 1-12; Year: 2019.
Second Office Action issued in Japanese Patent Application No. 2017-557268, dated Feb. 26, 2019, 5 pages.
Atay, Nuzhet , et al., "A Motion Planning Processor on Reconfigurable Hardware", All Computer Science and Engineering Research, Computer Science and Engineering; Report No. WUCSE-2005-46; Sep. 23, 2005.
Hauck, Scott , et al., "Configuration Compression for the Xilinx XC6200 FPGA", IEEE Transactions on Computer-Aided Design of Integrated Circuits and Systems, vol. 18, No. 8; Aug. 1999.
Johnson, David E., et al., "Bound Coherence for Minimum Distance Computations", Proceedings of the 1999 IEEE International Conference on Robotics and Automation, May 1999.
Kavraki, L.E. , et al., "Probabilistic Roadmaps for Path Planning in High-Dimensional Configuration Spaces", IEEE Transactions on Robotics and Automation, IEEE Inc.; vol. 12, No. 4, pp. 566-580; Aug. 1, 1996.
Murray, Sean , et al., "Robot Motion Planning on a Chip", Robotics: Science and Systems 2016; Jun. 22, 2016; 9 pages.
Murray, Sean , et al., "The microarchitecture of a real-time robot motion planning accelerator", 2016 49th Annual IEEE/ACM International Symposium on Microarchitecture (Micro), IEEE, Oct. 15, 2016, 12 pages.
Rodriguez, Carlos , et al., "Planning manipulation movements of a dual-arm system considering obstacle removing", Robotics and Autonomous Systems, Elsevier Science Publishers, vol. 62, No. 12, pp. 1816-1826; Aug. 1, 2014.
Stilman, Mike , et al., "Manipulation Planning Among Movable Obstacles", Proceedings of the IEEE Int. Conf. on Robotics and Automation, Apr. 2007.
European Search Report dated Jul. 23, 2021, for European Application No. 19851097.6, 15 pages.
Taiwanese First Office Action—Application No. 106119452 dated Jun. 18, 2021, 25 pages.
Corrales, J.A., et al., Safe Human-robot interaction based on dynamic sphere-swept line bounding volumes, Robotic and Computer-Integrated Manufacturing 27 (2011) 177-185, 9 page.
Pobil, Angel P, et al., "A New Representation for Collision Avoidance and Detection", Proceedings of the 1992 IEEE, XP000300485, pp. 246-251.
Sato, Yuichi, et al., "Efficient Collision Detection using Fast Distance-Calculation Algorithms for Convex and Non-Convex Objects", Proceeding of the 1996 IEEE, XP-000750294, 8 pages.
Turrillas, Alexander Martin, "Improvement of a Multi-Body Collision Computation Framework and Its Application to Robot (Self-) Collision Avoidance", German Aerospace Center (DLR). Master's Thesis, Jun. 1, 2015, 34 pages.
Non-Final Office Action issued in U.S. Appl. No. 16/268,290, dated Jan. 27, 2021, 54 pages.
Communication Pursuant to Article 94(3) EPC, issued in European Application No. 18209405.2, dated Nov. 23, 2020, 4 pages.
European Search Report dated Nov. 17, 2020 for EP Application No. 16743821.7, 4 pages.
Non-Final Office Action issued in U.S. Appl. No. 16/308,693, dated Dec. 11, 2020, 17 pages.
Non-Final Office Action Issued in U.S. Appl. No. 16/268,290, dated Jun. 17, 2021, 35 pages.
Sicilliano et al. "Robotics. Modelling, Planning and Control", Chapter 12: Motion Planning, pp. 523-559, 2009.
Chen, Chao , Motion Planning for Nonholonomic Vehicles with Space Exploration Guided Heuristic Search, 2016, IEEE.com, Whole Document, 140 pages.

(56) References Cited

OTHER PUBLICATIONS

Pan, Jia, et al., Efficient Configuration Space Construction and Optimization for Motion Planning, 2015, Research Robotics, Whole Document, 12 pages.
International Search Report and Written Opinion for PCT/US2021/061427, dated Apr. 29, 2022, 14 pages.
Non-Final Office Action Issued in U.S. Appl. No. 16/909,096 dated May 6, 2022, 49 pages.
Bharathi Akilan et al; "Feed-rate optimization for smooth minimum-time trajectory generation with higher order constraints", The International Journal of Advanced Manufacturing Technology, vol. 82, No. 5, Jun. 28, 2015 (Jun. 28, 2015), pp. 1029-1040.
Dong et al: "Feed-rate optimization with jerk constraints for generating minimum-time trajectories", International Journal of Machine Tool Design and Research, Pergamon Press, Oxford, GB, vol. 47, No. 12-13, Aug. 9, 2007 (Aug. 9, 2007), pp. 1941-1955.
Extended EP Search Report dated Jul. 18, 2022 EP App No. 20832308.9-1205, 10 pages.
Extended EP Search Report dated Jul. 25, 2022 EP App No. 20857383.2-1205, 10 pages.
Sonja MacFarlane et al: "Jerk-Bounded Manipulator Trajectory Planning: Design for Real-Time Applications", IEEE Transactions on Robotics and Automation, IEEE Inc, New York, US, vol. 19, No. 1, Feb. 1, 2003 (Feb. 1, 2003), XP011079596, ISSN: 1042-296X.
Final Office Action dated Sep. 7, 2022, for U.S. Appl. No. 16/909,096, 54 pages.
Gasparetto A et al: "Experimental validation and comparative analysis of optimal time-jerk algorithms for trajectory planning", Robotics and Computer Integrated Manufacturing, Elsevier Science Publishers BV., Barking, GB, vol. 28, No. 2, Aug. 5, 2011.
Gasparetto et al: "A new method for smooth trajectory planning of robot manipulators", Mechanism and Machine Theory, Pergamon, Amsterdam, NL, vol. 42, No. 4, Jan. 26, 2007.
Haschke R et al: "On-Line Planning of Time-Opti.mal, Jerk-Limited Trajectories", Internet Citation, Jul. 1, 2008 (Jul. 1, 2008), pp. 1-6, XP00278977 6.
Jan Mattmuller et al: "Calcuiating a near time-optimal jerk-constrained trajeciory along a specified smooth path", The International Journal of Advanced Manufacturing Technology, Springer, Berlin, DE, vol. 45, No. 9-10, Apr. 19, 2009.
Lin Jianjie et al: "An Efficient and Time-Optimal Trajectory Generation Approach for Waypoints Under Kinematic Constraints and Error Bounds", 2018 IEEE/RSJ International Conference on Intelligent Robots and Systems (IROS), IEEE, Oct. 1, 2018.
Non-Final Office Action dated Sep. 14, 2022, for U.S. Appl. No. 16/999,339, 18 pages.
Ratliff, et al., "CHOMP: Gradient Optimization Techniques for Efficient Motion Planning", 2009 IEEE International Conferenced on Robotics and Automation, Kobe, Japan, May 12-17, 2009, 6 pages.
S. Saravana Perumaal et al: "Automated Trajectory Planner of Industrial Robot for Pick-and-Place Task", International Journal of Advanced Robotic Systems, vol. 10, No. 2, Jan. 1, 2013.

\* cited by examiner

APPARATUS, METHODS AND ARTICLES TO FACILITATE MOTION PLANNING IN ENVIRONMENTS HAVING DYNAMIC OBSTACLES

BACKGROUND

Technical Field

The present disclosure generally relates to motion planning using motion planning lattices with collision assessment, and in particular to systems and methods that facilitate motion planning for primary agents (e.g., autonomous vehicles) in environments having dynamic obstacles (e.g., other autonomous vehicles, other vehicles, people, animals, courtesy regions) and static obstacles (e.g., trees, buildings, trees, rocks, walls, barricades, lane markers, centerlines, other road markings, road edges).

Description of the Related Art

Motion planning is a fundamental problem in robotics. Motion planning may be employed to control the motion of autonomous vehicles or control the motion of other types of robots or portions of robots (e.g., robotic appendages, end effectors, end of arm tools). A motion plan can specify a series of transitions or a "path" an autonomous vehicle or a robot or portion thereof can follow from a first state (e.g., starting configuration or starting pose) to a goal state (e.g., ending configuration or ending pose), typically without colliding with any obstacles in an operational environment or with a reduced possibility of colliding with any obstacles in the operational environment. Obstacles may take any one or more of a variety of forms, including static physical obstacles (e.g., trees, buildings, trees, rocks, walls, barricades, lane markers, centerlines, other road markings, road edges), static conceptual obstacles (e.g., "courtesy" regions about static physical obstacles), dynamic physical obstacles (e.g., other autonomous vehicles, other vehicles, people, animals), and dynamic conceptual obstacles (e.g., courtesy regions about dynamic physical obstacles and/or other logical constructs with respect to dynamic physical obstacles).

There are typically four main components involved in creating a motion plan: perception, lattice construction, collision assessment (also commonly referred to as collision detection) and path search. Each provides challenges to overcome within an operational environment through which the autonomous vehicle transits or other type of robot moves, that includes static obstacles, and in particular, that includes dynamic obstacles moving within the operational environment. The future movements of the dynamic obstacles may be known or may be unknown or uncertain. It is advantageous for the autonomous vehicle (or other type of robot) to perform motion planning to keep up with changes in the operational environment in real time to avoid collision with both dynamic and static obstacles to achieve the goal state.

BRIEF SUMMARY

A motion planner performs motion planning using a motion planning lattice that represents configuration states of a primary agent (e.g., autonomous vehicle) as nodes and transitions between states as edges. The motion planner preferably performs collision assessment, determining whether or the likelihood or probability that a primary agent will collide with an obstacle in transiting between two states or configurations. The motion planner may assign cost values to edges of the motion planning lattice, the cost values representing a likelihood or probability of collision for the corresponding transition. The assigned cost values may additionally or alternatively represent a severity of collision, for example generated via a parametric function with two or more parameters and one or more weights. The motion planner may perform a least cost analysis on the motion planning lattice to determine a set of transitions or "path" from one state or configuration to another state or configuration. The motion planner may cause an actuator or transmission of the primary agent to implement a motion plan with an identified set of transitions or path.

The primary agent and/or dynamic obstacles may advantageously be represented as respective oriented bounding boxes. Some obstacles (e.g., road markings, edge of road) may be advantageously represented as curves. A trajectory of a primary agent and/or dynamic obstacle may advantageously be represented by respective sets of fitted functions (e.g., fitted polynomial functions), for instance in lieu of motion equations. Fitted functions may advantageously require less computational expense when performing collision assessment than motion equations for example by avoiding the need to evaluate trigonometric functions.

Aspects:

Aspect 1. A motion planning method of operation in a processor-based system to perform motion planning via planning lattices is described, where each planning lattice respectively comprises a plurality of nodes and edges, each node representative of a state of a primary vehicle which operates in an environment that includes one or more other vehicles and other obstacles, and each edge representative of a transition between a respective pair of the nodes. The method may be summarized as including: representing, by the processor-based system, the primary vehicle as a respective oriented bounding box; and for at least one of a plurality of the edges of the planning lattice, performing, by the processor-based system, oriented bounding box collision detection to determine whether the primary vehicle represented by the oriented bounding box will collide with representations of other vehicles or other obstacles in transitioning between a pair of states, the state of the pair represented by respective nodes of a pair of nodes that are connected by the respective edge of the planning lattice; and setting, by the processor-based system, a cost of the respective edge of a planning lattice to reflect at least one of the detected collision or absence thereof.

Aspect 2. The motion planning method of aspect 1, further comprising: representing, by the processor-based system, at least one of the other vehicles as a respective oriented bounding box, and wherein performing oriented bounding box collision detection includes performing oriented bounding box-oriented bounding box collision detection to determine whether the respective oriented bounding box that represents the primary vehicle will collide with the respective oriented bounding box that represents the at least one of the other vehicles in transitioning between the pair of states represented by respective nodes that are connected by the respective edge of the planning lattice.

Aspect 3. The motion planning method of aspect 1, further comprising: representing, by the processor-based system, at least one of the other obstacles as a respective oriented bounding box, and wherein performing oriented bounding box collision detection includes performing oriented bounding box-oriented bounding box collision detection to determine whether the respective oriented bounding box that represents the primary vehicle will collide with the respective oriented bounding box that represents the at least one of the other obstacles in transitioning between the pair of states represented by respective nodes that are connected by the respective edge of the planning lattice.

Aspect 4. The motion planning method of aspect 1, further comprising: representing, by the processor-based system, at least one other obstacle as a representation of a curve, and wherein performing oriented bounding box collision detection to determine whether the primary vehicle represented by a respective oriented bounding box collides with other vehicles or other obstacles includes performing oriented bounding box-curve collision detection to determine whether the respective oriented bounding box that represents the primary vehicle will collide with the curve that represents the at least one of the other obstacles in transitioning between the pair of states represented by respective nodes that are connected by the respective edge of the planning lattice.

Aspect 5. The motion planning method of aspect 4 wherein representing at least one other obstacle as a representation of a curve includes representing at least one of a centerline of a road, an edge of a road, or at least one lane marker of a road as spline representation.

Aspect 6. The motion planning method of any of aspects 1 through 5 wherein performing oriented bounding box collision detection includes performing oriented bounding box collision detection at each of at least one point along a respective trajectory of the primary vehicle using a set of fitted functions to represent the respective trajectory of the primary vehicle corresponding to the respective edge of the planning lattice.

Aspect 7. The motion planning method of any of aspects 1 through 5 wherein performing oriented bounding box collision detection includes performing oriented bounding box collision detection via a plurality of distinct hardware circuits.

Aspect 8. The motion planning method of any of aspects 1 through 5 wherein setting a cost of the respective edge of a planning lattice to reflect at least one of the detected collision or absence thereof includes setting the cost of one or more of the respective edges of a planning lattice according to a parameterized cost function to reflect the detection of a collision and to reflect at least one parameter representative of a severity of the detected collision.

Aspect 9. The motion planning method of any of aspects 1 through 5, further comprising: performing, by the processor-based system, a least cost analysis of the planning lattice; and implementing, by the processor-based system, a resultant motion plan by the primary vehicle based at least in part on the least cost analysis.

Aspect 10. A processor-based system to perform motion planning via planning lattices is described, where each planning lattice respectively comprises a plurality of nodes and edges, each node representative of a state of a primary vehicle which operates in an environment that includes one or more other vehicles and other obstacles, and each edge representative of a transition between a respective pair of the nodes. The processor-based system may be summarized as including: at least one processor; at least one nontransitory processor-readable medium communicatively coupled to the at least one processor and that stores processor-executable instructions that, when executed by the at least one processor, cause the at least one processor to: represent the primary vehicle as a respective oriented bounding box; and for at least one of a plurality of the edges of the planning lattice, perform oriented bounding box collision detection to determine whether the primary vehicle represented by the oriented bounding box will collide with representations of other vehicles or other obstacles in transitioning between a pair of states, the state of the pair represented by respective nodes of a pair of nodes that are connected by the respective edge of the planning lattice; and set a cost of the respective edge of a planning lattice to reflect at least one of the detected collision or absence thereof.

Aspect 11. The processor-based system of aspect 10 wherein the processor-executable instructions, when executed by the at least one processor, cause the at least one processor further to: represent at least one of the other vehicles as a respective oriented bounding box, and wherein performing oriented bounding box collision detection includes performing oriented bounding box-oriented bounding box collision detection to determine whether the respective oriented bounding box that represents the primary vehicle will collide with the respective oriented bounding box that represents the at least one of the other vehicles in transitioning between the pair of states represented by respective nodes that are connected by the respective edge of the planning lattice.

Aspect 12. The processor-based system of aspect 10 wherein the processor-executable instructions, when executed by the at least one processor, cause the at least one processor further to: represent at least one of the other obstacles as a respective oriented bounding box, and perform the oriented bounding box collision detection as oriented bounding box-oriented bounding box collision detection to determine whether the respective oriented bounding box that represents the primary vehicle will collide with the respective oriented bounding box that represents the at least one of the other obstacles in transitioning between the pair of states represented by respective nodes that are connected by the respective edge of the planning lattice.

Aspect 13. The processor-based system of aspect 10 wherein the processor-executable instructions, when executed by the at least one processor, cause the at least one processor further to: represent at least one other obstacle as a representation of a curve, and perform the oriented bounding box collision detection as oriented bounding box-curve collision detection to determine whether the respective oriented bounding box that represents the primary vehicle will collide with the curve that represents the at least one of the other obstacles in transitioning between the pair of states represented by respective nodes that are connected by the respective edge of the planning lattice.

Aspect 14. The processor-based system of aspect 13 wherein the processor-executable instructions, when executed by the at least one processor, cause the at least one processor to: represent at least one other obstacle as a representation of a curve includes representing at least one of a centerline of a road, an edge of a road, or at least one lane marker of a road as spline representation.

Aspect 15. The processor-based system of any of aspects 10 through 14 wherein the processor-executable instructions, when executed by the at least one processor, cause the at least one processor to perform the oriented bounding box collision detection at each of at least one point along a respective trajectory of the primary vehicle via a set of fitted functions to represent the respective trajectory of the primary vehicle corresponding to the respective edge of the planning lattice.

Aspect 16. The processor-based system of any of aspects 10 through 14 wherein performing oriented bounding box collision detection includes performing oriented bounding box collision detection via a plurality of distinct hardware circuits.

Aspect 17. The processor-based system of any of aspects 10 through 14 wherein the processor-executable instructions, when executed by the at least one processor, cause the at least one processor to set the cost of the respective edge of a planning lattice based on a parameterized cost function to reflect the detection of a collision and to reflect a severity of the detected collision.

Aspect 18. The processor-based system of any of aspects 9 through 14 wherein the processor-executable instructions, when executed by the at least one processor, cause the at least one processor further to: perform a least cost analysis of the planning lattice; and implement a resultant motion plan by the primary vehicle based at least in part on the least cost analysis.

Aspect 19. A motion planning method of operation in a processor-based system to perform motion planning via planning lattices is described, where each planning lattice respectively comprises a plurality of nodes and edges, each node which characterizes a state of a primary vehicle, the primary vehicle which operates in an environment that includes one or more other vehicles and other obstacles, and each edge represents a trajectory of the primary vehicle between states represented by a respective pair of the nodes. The method may be summarized as including: during a runtime, for each of a number of the edges of a planning lattice, representing, by the processor-based system, the trajectory corresponding to the respective edge as a set of fitted functions, performing, by the processor-based system, collision detection using the set of fitted functions to determine whether a representation of the primary vehicle collides with one or more representations of other vehicles or other obstacles; and setting, by the processor-based system, a cost of the respective edge of the planning lattice to reflect at least one of the determined collision or absence thereof in transitioning between a pair of states represented by respective nodes that are connected by the respective edge of the planning lattice. The fitted functions may advantageously avoid the use of trigonometric functions.

Aspect 20. The motion planning method of aspect 19, further comprising: receiving, by the processor-based system, the set of fitted functions at the processor-based system of the primary vehicle from a configuration system located remotely from the primary vehicle, the set of fitted functions which were fitted by the configuration system prior to the runtime.

Aspect 21. The motion planning method of aspect 19 wherein performing collision detection using a set of fitted functions to determine whether the primary vehicle collides with other vehicles or other obstacles includes performing collision detection using a pair of fitted polynomial functions, one fitted polynomial function of the pair representing a position in a first dimension with respect to time and the other fitted polynomial function of the pair representing a position in a second dimension relative to a time, the second dimension different than the first dimension.

Aspect 22. The motion planning method of aspect 19 wherein performing collision detection using a set of fitted functions to determine whether the primary vehicle collides with other vehicles or other obstacles includes performing collision detection using a pair of fitted time parametric functions to determine whether the primary vehicle collides with other vehicles or other obstacles.

Aspect 23. The motion planning method of aspect 19 wherein performing collision detection using a set of fitted functions to determine whether the primary vehicle collides with other vehicles or other obstacles includes performing collision detection using a pair of fitted time parametric quintic functions to determine whether the primary vehicle collides with other vehicles or other obstacles.

Aspect 24. The motion planning method of aspect 19 wherein performing collision detection using a set of fitted functions to determine whether the primary vehicle collides with other vehicles or other obstacles includes performing collision detection using a pair of fitted functions that are specific to a make and model of the primary vehicle and provided by an original equipment manufacturer of the primary vehicle.

Aspect 25. The motion planning method of aspect 19 wherein performing collision detection using a set of fitted functions to determine whether the primary vehicle collides with other vehicles or other obstacles includes performing collision detection using a pair of fitted polynomial functions with parameters that are specific to a make and model of the primary vehicle and provided by an original equipment manufacturer of the primary vehicle.

Aspect 26. The motion planning method of any of aspects 19 through 25 wherein performing collision detection using a set of fitted functions to determine whether the primary vehicle collides with other vehicles or other obstacles includes performing the collision detection at one or more points along a respective trajectory of the primary vehicle, the respective trajectory specified via the set of fitted functions to represent the respective trajectory of the primary vehicle corresponding to the respective edge of the planning lattice.

Aspect 27. The motion planning method of any of aspects 19 through 25 wherein performing collision detection using a set of fitted functions to determine whether the primary vehicle collides with other vehicles or other obstacles includes performing the collision detection via a plurality of distinct hardware circuits.

Aspect 28. The motion planning method of any of aspects 19 through 25 wherein setting a cost of the respective edge of a planning lattice to reflect at least one of the detected collision or absence thereof includes setting the cost of one or more of the respective edges of a planning lattice according to a parameterized cost function to reflect the detection of a collision and to reflect a severity of the detected collision.

Aspect 29. The motion planning method of any of aspects 19 through 25, further comprising: performing, by the processor-based system, a least cost analysis of the planning lattice; and implementing, by the processor-based system, a resultant motion plan by the primary vehicle based at least in part on the least cost analysis.

Aspect 30. The motion planning method of any of aspects 19 through 25, further comprising: during an offline configuration time that occurs before the runtime, for each of a plurality of the edges, fitting a respective set of polynomial functions to a motion represented by the trajectory that the edge represents.

Aspect 31. A processor-based system to perform motion planning via planning lattices is described, where each planning lattice respectively comprises a plurality of nodes and edges, each node which characterizes a state of a primary vehicle, the primary vehicle which operates in an environment that includes one or more other vehicles and other obstacles, and each edge represents a trajectory of the primary vehicle between states represented by a respective pair of the nodes The processor-based system may be summarized as including: at least one processor; at least one nontransitory processor-readable medium communicatively coupled to the at least one processor and that stores processor-executable instructions that, when executed by the at least one processor, cause the at least one processor to: during a runtime, for each of a number of the edges of a planning lattice, represent the trajectory corresponding to the respective edge as a set of fitted functions, perform collision detection using the set of fitted functions to determine whether a representation of the primary vehicle collides with one or more representations of other vehicles or other obstacles; and set a cost of the respective edge of the planning lattice to reflect at least one of the determined collision or absence thereof in transitioning between a pair of states represented by respective nodes that are connected by the respective edge of the planning lattice. The fitted functions may advantageously avoid the use of trigonometric functions.

Aspect 32. The processor-based system of aspect 31 wherein the processor-executable instructions, when executed by the at least one processor, cause the at least one processor further to: receive the set of fitted functions at the processor-based system of the primary vehicle from a configuration system located remotely from the primary vehicle, the set of fitted functions which were fitted by the configuration system prior to the runtime.

Aspect 33. The processor-based system of aspect 31 wherein the processor-executable instructions, when executed by the at least one processor, cause the at least one processor to perform the collision detection with a pair of fitted polynomial functions, one fitted polynomial function of the pair representing a position in a first dimension with respect to time and the other fitted polynomial function of the pair representing a position in a second dimension relative to a time, the second dimension different than the first dimension.

Aspect 34. The processor-based system of aspect 31 wherein the processor-executable instructions, when executed by the at least one processor, cause the at least one processor to perform the collision detection with a pair of fitted time parametric functions to determine whether the primary vehicle collides with other vehicles or other obstacles.

Aspect 35. The processor-based system of aspect 31 wherein the processor-executable instructions, when executed by the at least one processor, cause the at least one processor to perform the collision detection with a pair of fitted time parametric quintic functions to determine whether the primary vehicle collides with other vehicles or other obstacles.

Aspect 36. The processor-based system of aspect 31 wherein the processor-executable instructions, when executed by the at least one processor, cause the at least one processor to perform the collision detection with a pair of fitted functions that are specific to a make and model of the primary vehicle and provided by an original equipment manufacturer of the primary vehicle.

Aspect 37. The processor-based system of aspect 31 wherein the processor-executable instructions, when executed by the at least one processor, cause the at least one processor to perform the collision detection with a pair of fitted polynomial functions with parameters that are specific to a make and model of the primary vehicle and provided by an original equipment manufacturer of the primary vehicle.

Aspect 38. The processor-based system of any of aspects 31 through 37 wherein the processor-executable instructions, when executed by the at least one processor, cause the at least one processor to perform the collision detection at one or more points along a respective trajectory of the primary vehicle, the respective trajectory specified via the set of fitted functions to represent the respective trajectory of the primary vehicle corresponding to the respective edge of the planning lattice.

Aspect 39. The processor-based system of any of aspects 31 through 37 wherein the processor-executable instructions, when executed by the at least one processor, cause the at least one processor to perform the collision detection via a plurality of distinct hardware circuits.

Aspect 40. The processor-based system of any of aspects 31 through 37 wherein the processor-executable instructions, when executed by the at least one processor, cause the at least one processor to set the cost of the respective edge of a planning lattice to reflect at least one of the detected collision or absence via a parameterized cost function to reflect the detection of a collision and to reflect a severity of the detected collision.

Aspect 41. The processor-based system of any of aspects 31 through 37 wherein the processor-executable instructions, when executed by the at least one processor, cause the at least one processor further to: perform a least cost analysis of the planning lattice; and implement a resultant motion plan by the primary vehicle based at least in part on the least cost analysis.

Aspect 42. The processor-based system of any of aspects 31 through 37 wherein the processor-executable instructions, when executed by the at least one processor, cause the at least one processor further to: during an offline configuration time that occurs before the runtime, for each of a plurality of the edges, fit a respective set of functions to a motion represented by the trajectory that the edge represents.

Aspect 43. A motion planning method of operation in a processor-based system to perform motion planning via planning lattices is described, where each planning lattice respectively comprises a plurality of nodes and edges, each node which characterizes a state of a primary vehicle, the primary vehicle which operates in an environment that includes one or more other vehicles and other obstacles, and each edge represents a trajectory of the primary vehicle between states represented by a respective pair of the nodes. The method may be summarized as including: during an offline configuration time that occurs before the runtime, for each of a plurality of the edges of a planning lattice, determining a set of fitted functions that are fitted to a motion represented by the trajectory that the edge represents; and providing the set of fitted functions for use in motion planning by a processor-based system of a primary vehicle.

Aspect 44. The motion planning method of aspect 43 wherein determining a set of fitted functions fitted to a motion represented by the trajectory that the edge represents includes fitting the set of fitted functions to a motion represented by the trajectory.

Aspect 45. The motion planning method of aspect 43 wherein determining a set of fitted functions fitted to a motion represented by the trajectory that the edge represents includes determining a pair of fitted polynomial functions, one fitted polynomial function of the pair representing a position along the trajectory in a first dimension with respect to time and the other fitted polynomial function of the pair representing a position along the trajectory in a second dimension relative to a time, the second dimension different than the first dimension.

Aspect 46. The motion planning method of aspect 43 wherein determining a set of fitted functions fitted to a motion represented by the trajectory that the edge represents includes determining a pair of fitted time parametric functions that represent the trajectory.

Aspect 47. The motion planning method of aspect 43 wherein determining a set of fitted functions fitted to a motion represented by the trajectory that the edge represents includes determining a pair of fitted time parametric quintic functions that represent the trajectory.

Aspect 48. The motion planning method of aspect 43 wherein determining a set of fitted functions fitted to a motion represented by the trajectory that the edge represents includes determining a pair of fitted functions that are specific to a make and model of the primary vehicle as specified by an original equipment manufacturer of the primary vehicle.

Aspect 49. The motion planning method of aspect 43 wherein determining a set of fitted functions fitted to a motion represented by the trajectory that the edge represents includes determining a pair of fitted polynomial functions with parameters that are specific to a make and model of the primary vehicle by an original equipment manufacturer of the primary vehicle, and providing the determined pair of fitted polynomial functions with parameters that are specific to a make and model of the primary vehicle to a processor-based control system of the primary vehicle, where the primary vehicle is an autonomous vehicle.

Aspect 50. A motion planning method of operation in a processor-based system to perform motion planning via planning lattices is described, where each planning lattice respectively comprises a plurality of nodes and edges, each node characterizes a state of a primary vehicle which operates in an environment that includes one or more obstacles, and each edge represents a transition between a respective pair of the nodes. The method may be summarized: for each of at least one of a plurality of the edges of the planning lattice, performing, by the processor-based system, collision detection to determine whether a representation of the primary vehicle will collide with representations of the obstacles in transitioning between a pair of states, the state of the pair represented by respective nodes of a pair of nodes that are connected by the respective edge of the planning lattice; and setting, by the processor-based system, a cost associated with the respective edge of the planning lattice based at least in part on: i) the collision detection, and ii) a parameterized cost function that represents at least two or more of: an obstacle type, a collision type, a vehicle speed, or at least an estimate of dissipated energy that would be dissipated during the collision, the obstacle type indicative of a type of obstacle with which a collision may occur, the collision type indicative of a type of collision which may occur, and the vehicle speed indicative of a speed of at least the primary vehicle immediately prior to a predicted collision.

Aspect 51. The motion planning method of aspect 50 wherein the obstacle type is indicative of whether the obstacle is an animate or inanimate obstacle, and setting a cost associated with the respective edge includes setting the cost based at least in part on whether the obstacle is an animate or inanimate obstacle.

Aspect 52. The motion planning method of aspect 50 wherein the collision type is indicative of whether the collision is a collision with a physical obstacle which will result in damage to either the physical obstacle or the primary vehicle or is a collision with a spacing requirement or a road marker which will not directly result in damage to the primary vehicle, and setting a cost associated with the respective edge includes setting the cost based at least in part on whether the collision is with a physical obstacle which will result in damage to either the physical obstacle or the primary vehicle or the collision is with a road marker which will not result in damage to the road marker.

Aspect 53. The motion planning method of aspect 50 wherein the vehicle speed is indicative of a speed of the primary vehicle in a real world reference frame, and setting a cost associated with the respective edge includes setting the cost based at least in part on the speed of the primary vehicle in the real world reference frame.

Aspect 54. The motion planning method of aspect 50 wherein the vehicle speed is indicative of a speed of the primary vehicle relative to a speed of the obstacle, and setting a cost associated with the respective edge includes setting the cost based at least in part on the speed of the primary vehicle relative to a speed of the obstacle.

Aspect 55. The motion planning method of aspect 50 wherein the vehicle speed is indicative of both a speed of the primary vehicle and a speed of the obstacle, and setting a cost associated with the respective edge includes setting the cost based at least in part on the speed of both the primary vehicle and the speed of the obstacle.

Aspect 56. The motion planning method of aspect 50 wherein the parameterized cost function also represents a level of severity of collision based on vehicle speed, and setting a cost associated with the respective edge includes setting the cost based at least in part on a level of severity based on vehicle speed of at least one or both of the primary vehicle and the obstacle.

Aspect 57. The motion planning method of any of aspects 50 through 56 wherein performing collision detection includes performing the collision detection via a plurality of distinct hardware circuits.

Aspect 58. The motion planning method of any of aspects 50 through 56, further comprising: performing, by the processor-based system, a least cost analysis of the planning lattice; and implementing, by the processor-based system, a resultant motion plan by the primary vehicle based at least in part on the least cost analysis.

Aspect 59. A processor-based system to perform motion planning via planning lattices is described, where each planning lattice respectively comprises a plurality of nodes and edges, each node characterizes a state of a primary vehicle which operates in an environment that includes one or more obstacles, and each edge represents a transition between a respective pair of the nodes. The processor-based system may be summarized as including: at least one processor; at least one nontransitory processor-readable medium communicatively coupled to the at least one processor and that stores processor-executable instructions that, when executed by the at least one processor, cause the at least one processor to: for at least one of a plurality of the edges of the planning lattice, perform collision detection to determine whether a representation of the primary vehicle will collide with representations of the obstacles in transitioning between a pair of states, the state of the pair represented by respective nodes of a pair of nodes that are connected by the respective edge of the planning lattice; and set a cost associated with the respective edge of the planning lattice based at least in part on: i) the collision detection, and ii) a parameterized cost function that represents at least two or more of: an obstacle type, a collision type, a vehicle speed, or at least an estimate of dissipated energy that would be dissipated during the collision, the obstacle type indicative of a type of obstacle with which a collision may occur, the collision type indicative of a type of collision which may occur, the vehicle speed indicative of a speed of at least the primary vehicle immediately prior to a predicted collision.

Aspect 60. The motion planning method of aspect 59 wherein the obstacle type is indicative of whether the obstacle is an animate or inanimate obstacle, the processor-executable instructions, when executed by the at least one processor, cause the at least one processor to: set the cost based at least in part on whether the obstacle is an animate or inanimate obstacle.

Aspect 61. The motion planning method of aspect 59 wherein the collision type is indicative of whether the collision is a collision with a physical obstacle which will result in damage to either the physical obstacle or the primary vehicle or is a collision with a spacing requirement or a road marker which will not directly result in damage to the primary vehicle, and the processor-executable instructions, when executed by the at least one processor, cause the at least one processor to: set the cost based at least in part on whether the collision is with a physical obstacle which will result in damage to either the physical obstacle or the primary vehicle or the collision is with a road marker which will not result in damage to the road marker.

Aspect 62. The motion planning method of aspect 59 wherein the vehicle speed is indicative of a speed of the primary vehicle in a real world reference frame, and the processor-executable instructions, when executed by the at least one processor, cause the at least one processor to: set the cost based at least in part on the speed of the primary vehicle in the real world reference frame.

Aspect 63. The motion planning method of aspect 59 wherein the vehicle speed is indicative of a speed of the primary vehicle relative to a speed of the obstacle, and the processor-executable instructions, when executed by the at least one processor, cause the at least one processor to: set a cost associated with the respective edge includes setting the cost based at least in part on the speed of the primary vehicle relative to a speed of the obstacle.

Aspect 64. The motion planning method of aspect 59 wherein the vehicle speed is indicative of both a speed of the primary vehicle and a speed of the obstacle, and the processor-executable instructions, when executed by the at least one processor, cause the at least one processor to: set a cost associated with the respective edge includes setting the cost based at least in part on the speed of both the primary vehicle and the speed of the obstacle.

Aspect 65. The motion planning method of aspect 59 wherein the parameterized cost function also represents a level of severity of collision based on vehicle speed, and the processor-executable instructions, when executed by the at least one processor, cause the at least one processor to: set a cost associated with the respective edge based at least in part on a level of severity based on vehicle speed of at least one or both of the primary vehicle and the obstacle.

Aspect 66. The motion planning method of any of aspects 59 through 65 wherein the processor-executable instructions, when executed by the at least one processor, cause the at least one processor to: perform the collision detection via a plurality of distinct hardware circuits.

Aspect 67. The motion planning method of any of aspects 59 through 65 wherein the processor-executable instructions, when executed by the at least one processor, cause the at least one processor further to: perform a least cost analysis of the planning lattice; and implement a resultant motion plan by the primary vehicle based at least in part on the least cost analysis.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
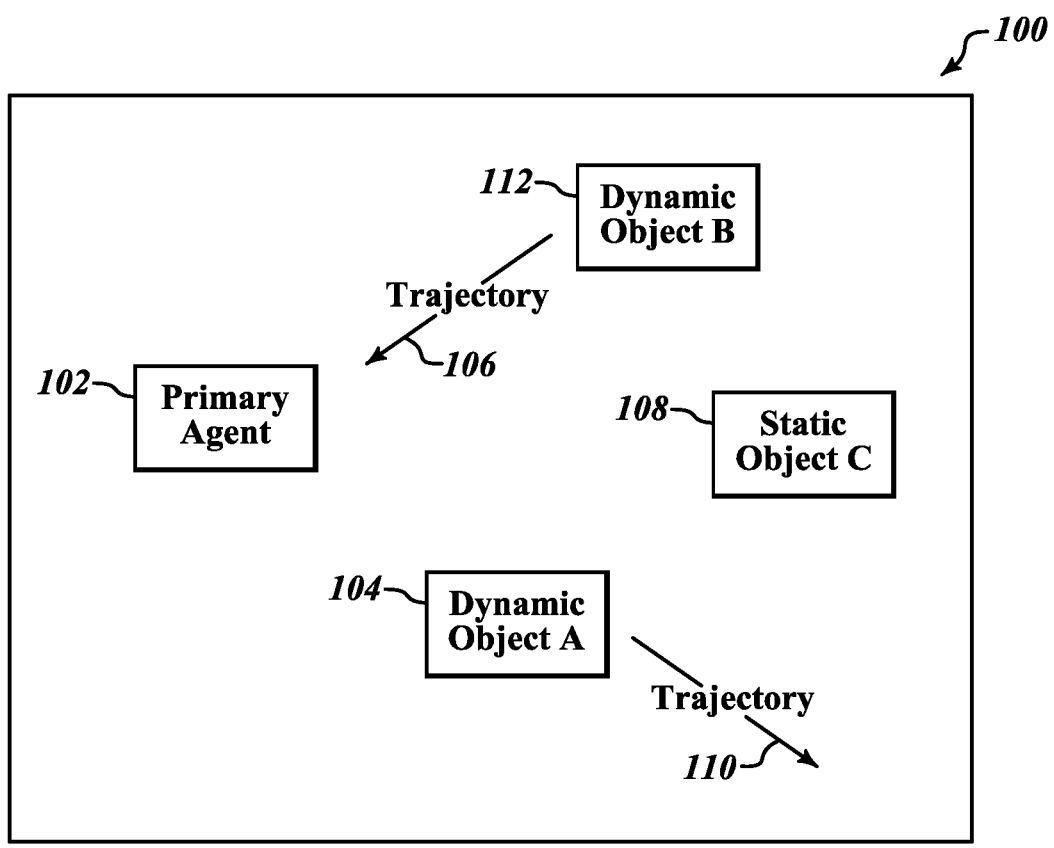
FIG. 1 is a schematic view of an operational environment in which a primary agent (e.g., autonomous vehicle) may operate, performing motion planning based on collision assessment with respect to dynamic obstacles and static obstacles in the operational environment, according to one illustrated implementation.

In the following description, certain specific details are set forth in order to provide a thorough understanding of various disclosed implementations or embodiments. However, one skilled in the relevant art will recognize that implementations or embodiments may be practiced without one or more of these specific details, or with other methods, components, materials, etc. In other instances, well-known structures associated with processor-based systems, computer systems, actuator systems, and/or communications networks have not been shown or described in detail to avoid unnecessarily obscuring descriptions of the implementations or embodiments. In other instances, well-known computer vision methods and techniques for generating perception data and representations of one or more primary vehicles, static obstacles, and/or dynamic obstacles and construction of digital representations (e.g., oriented bounding boxes, curves, occupancy grids and the like) of the same have not been described in detail to avoid unnecessarily obscuring descriptions of the implementations or embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or "one embodiment" or "an embodiment" means that a particular feature, structure or characteristic described in connection with the embodiment is included in at least one implementation or at least one embodiment. Thus, the appearances of the phrases "one implementation" or "an implementation" or "in one embodiment" or "in an embodiment" in various places throughout this specification are not necessarily all referring to the same implementation or the same embodiment. Furthermore, the particular features, structures, or characteristics may be combined in any suitable manner in one or more implementations or embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Reference throughout this specification and the appended claims to "primary agent" or "a primary agent" means an agent (e.g., semi- or fully-autonomous vehicle, other robot with or without moveable appendages) for which a respective motion plan is being formulated or generated. Reference throughout this specification to "other agent" or "another agent" or "secondary agent" or "a secondary agent" means an agent (e.g., semi- or fully-autonomous vehicle, other robot with or without moveable appendages, manually operated vehicle, human or animal) other than the primary agent for which the respective motion plan is being formulated or generated. In some instances, other instances of motion planning may be occurring for these other or secondary agents, but those motion plans do not represent the motions or the states of the primary agent.

Reference throughout this specification and the appended claims to an obstacle or obstacles means static obstacles and dynamic obstacles. Static obstacles include physical objects and logical constructs that remain static during a period of time for which motion planning is performed. A non-limiting set of examples of static obstacles includes: abutments, curbs, buildings, trees, rocks, walls, barricades, barriers, medians, lane markers, centerlines, other road markings, road edges whether marked or not, "courtesy" regions with respect to static physical obstacles (e.g., minimum desired spacing from other vehicles) and/or other logical spacing constructs (e.g., set offs or areas) with respect to static physical obstacles. Dynamic obstacles include physical objects and logical spacing constructs that move or change position during a period of time for which motion planning is performed. A non-limiting set of examples of dynamic obstacles includes: other autonomous vehicles, other vehicles, people, animals, courtesy regions about dynamic physical obstacles and/or other logical spacing constructs with respect to dynamic physical obstacles.

As used herein and in the claims, "courtesy regions" or "courtesy areas" mean volumes of space or area or distance offsets defined outwardly of an obstacle that provides a buffer around the obstacle. For example, a courtesy region may be defined around a vehicle to provide a buffer that accommodates tolerances of the motion planning system and/or vehicle, accommodate delays in taking evasive action, as well as providing a sense of comfort to passengers. Also for example, an offset from a lane marker or road edge may be defined. The courtesy region may be symmetrically disposed about a vehicle, but typically will not be symmetrical. For example, it may be beneficial to have a larger courtesy region in front of or behind a vehicle to account for stopping distances, as compared to a courtesy region on the sides of a vehicle. Similar buffers may exist around other types of dynamic obstacles (e.g., pedestrians) or even around static obstacles. Each of these constitute a logical spacing construct in that they provide a non-physical buffer area with respect to other obstacles.

Throughout this specification and the appended claims the term lattice is used interchangeably with the terms planning lattice, planning roadmap, and motion planning graph. A lattice is comprised by a set of nodes that represent respective states of the primary agent, typically in a configuration space (i.e., C-space), and a set of edges that represent respective transitions between respective states represented by the nodes. Notably, the lattice is distinguishable from the real world two-dimensional or three-dimensional representation of the operational environment.

Throughout this specification and the appended claims the term "collision detection" refers to predicting a collision or detecting a collision between representations of vehicles or other robots and obstacles in a model if the representation(s) is/are moved along a trajectory. Hence the terms collision detection and collision assessment are used interchangeably.

The headings and Abstract of the Disclosure provided herein are for convenience only and do not interpret the scope or meaning of the embodiments.

FIG. 1 shows a dynamic operational environment 100 in which an exemplary primary agent (e.g., primary autonomous vehicle) 102 may operate, according to one illustrated implementation. For the sake of brevity, the operational environment 100 is referred to herein as the environment 100. While generally described in terms of an autonomous vehicle, the various implementations described herein are applicable to other types of robots or portions thereof, for example robots that are operable to navigate an environment and/or robots with one or more moveable appendages.

The environment 100 represents a two-dimensional or three-dimensional space (i.e., two space; three space) in which the primary agent (e.g., primary autonomous vehicle) 102 may operate and move. The primary agent 102 may be an automobile, airplane, ship, copter, drone, or any other vehicle, or may be another type of robot, that can operate autonomously or semi-autonomously (i.e., at least partially autonomously) and move along routes or paths in the space represented by the environment 100. The environment 100 is the two- or three-dimensional space in which the vehicle operates and is different than the primary agent's or vehicle's "configuration space" (often called "C-space") referenced below with respect to the motion planning lattice (e.g., FIG. 5) and as explained in International Patent Application No. PCT/US2017/036880, filed Jun. 9, 2017 entitled "MOTION PLANNING FOR AUTONOMOUS VEHICLES AND RECONFIGURABLE MOTION PLAN- NING PROCESSORS," and in International Patent Application Publication No. WO 2016/122840, filed Jan. 5, 2016, entitled "SPECIALIZED ROBOT MOTION PLANNING HARDWARE AND METHODS OF MAKING AND USING SAME". The configuration space is typically many dimensional (i.e., greater than 3 dimensions).

For convenience of illustration, various implementations are described in terms of navigation through an environment in two dimensions. One of ordinary skill in the art will appreciate that the structures and acts described herein can extend to navigation through an environment in three dimensions.

Referring to FIG. 1, the environment 100 can include obstacle collision regions. These obstacle collision regions may be due to static obstacles (e.g., abutments, curbs, buildings, trees, rocks, walls, barricades, barriers, medians, lane markers, centerlines, other road markings, road edges, "courtesy" regions with respect to static physical obstacles and/or other logical constructs with respect to static physical obstacles). These obstacle collision regions may be due to dynamic physical obstacles (e.g., other autonomous vehicles, other vehicles, people, animals, courtesy regions about dynamic physical obstacles and/or other logical constructs with respect to dynamic physical obstacles). Static and dynamic obstacles may be collectively referred to as obstacles. Other vehicles (e.g., other autonomous vehicles, manually operated vehicles) may be collectively referred to as "agents" or "other agents," in the environment 100, although "agents" are not limited to vehicles but may include people or animals Static obstacle C 108 represents an obstacle that does not move in the environment 100 over a time period during which the primary agent 102 (e.g., primary autonomous vehicle) will be traversing or otherwise operating in the environment 100, and creates a static collision region in the environment 100 such that it is possible for primary agent 102 to collide with static obstacle C 108 if the primary agent 102 (e.g., primary autonomous vehicle) attempts to occupy the same space within the environment 100 as static obstacle C 108. In various embodiments, there may be fewer or additional static obstacles than shown in FIG. 1.

In addition to the static obstacles, dynamic obstacles 104, 112 may also be present, including those representing obstacles that move in known/certain trajectories (e.g., a turn arm of a toll gate, garage door), those that are controlled by a conscious being (e.g., a bicyclist, pedestrian, a driver, a pilot), and those that are controlled by other autonomous systems, such as in the case of other autonomous vehicles or other autonomous robots. Challenges to motion planning due to these dynamic obstacles 104, 112 involve the ability to perform motion planning at very fast speeds and the ability to analyze the uncertainty of how dynamic obstacles 104, 112 may move. The environment 100 surrounding the primary agent 102 (e.g., primary autonomous vehicle) can change rapidly, and it is advantageous for the primary agent 102 to perform motion planning to keep up with those changes. For example, as shown in FIG. 1, a dynamic obstacle A 104 (e.g., secondary autonomous vehicle), is currently moving along a trajectory 110 away from the primary agent 102. While collisions are generally avoided, Applicant notes that there may be instances where it is desirable for primary agent 102 to follow or intercept a dynamic obstacle A 104 (e.g., secondary autonomous vehicle), such as to inspect dynamic obstacle A 104, collect information from dynamic obstacle A 104, exchange information with dynamic obstacle A 104, or even collide with dynamic obstacle A 104 for instance in a game.

Conversely, as shown in FIG. 1, dynamic obstacle B 112 is currently moving along a trajectory 106 toward primary agent 102 (e.g., primary autonomous vehicle). Typically it is desirable for primary agent 102 to avoid collision with or avoid getting near dynamic obstacle B 112, such as to arrive at a goal destination without collision, avoid damage by such a collision, or to evade contact with dynamic obstacle B 112, for instance in a game. In one implementation, the goal of primary agent 102 is to maximize the time without a collision with dynamic obstacle B 112 such that, for example, primary agent 102 reaches a goal state without colliding with the dynamic obstacle B 112. In one example implementation, a goal of primary agent 102 is to transit between states while minimizing the probability of collision with dynamic obstacle B 112. There may be fewer or additional dynamic obstacles in the environment 100 than that shown in FIG. 1. Also, the environment 100 may in some instances have a boundary corresponding to a range of the primary agent 102, which may depend at least in part on a current fuel or energy available to vehicle 102 or an occupant comfort level.

While FIG. 1 illustrates a representative environment 100, typical environments may include many additional agents, including obstacles that correspond to other manned and autonomous vehicles and various other natural or artificial static and dynamic objects and obstacles. The concepts taught herein may be employed in a similar fashion with more populated environments than that illustrated.

Figure 2:
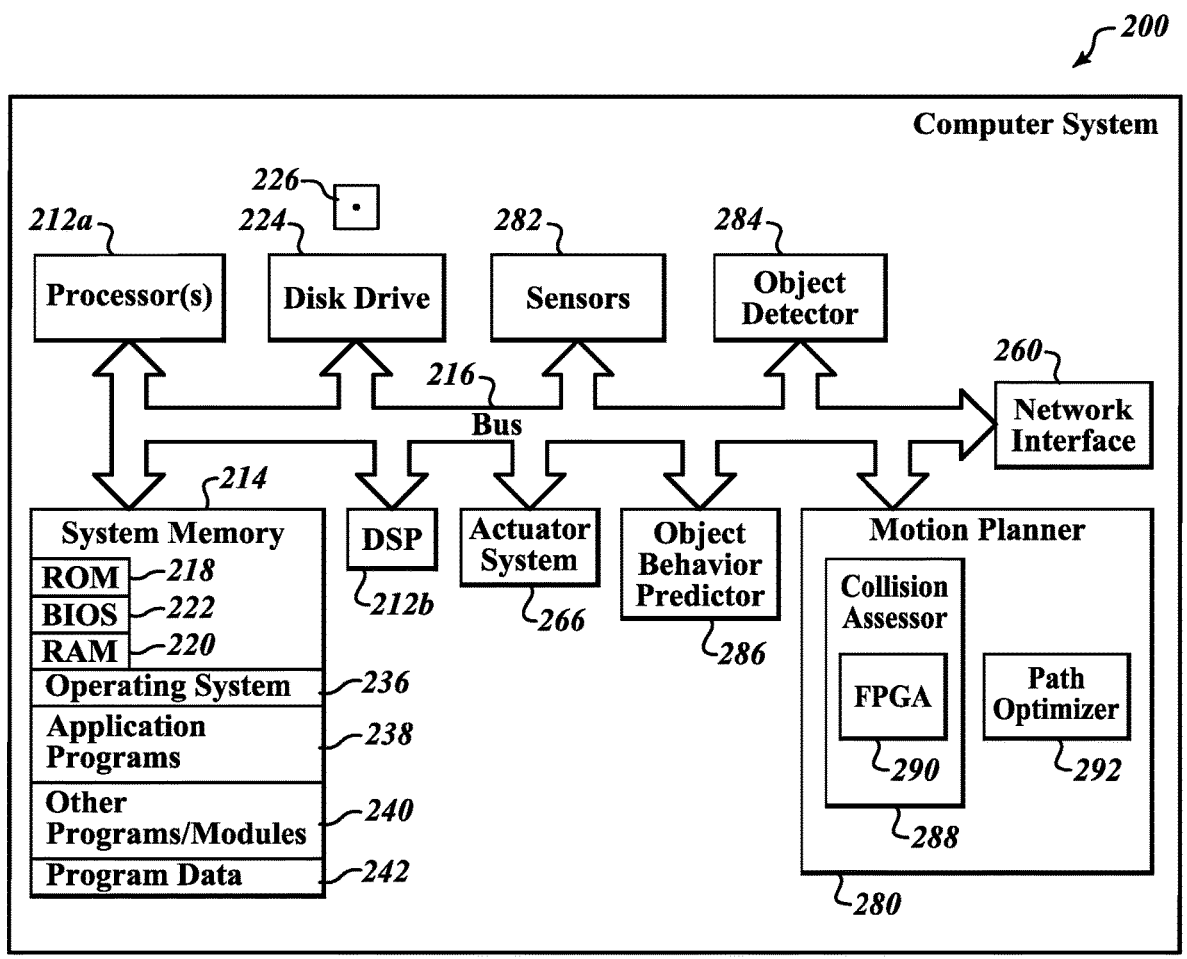
FIG. 2 is a functional block diagram of a processor-based system that may facilitate motion planning to operate the primary agent (e.g., vehicle) in the operational environment of FIG. 1, according to one illustrated implementation.

FIG. 2 and the following discussion provide a brief, general description of a suitable motion planner or motion planning controller in the form of a processor-based computer system 200 in which the various illustrated motion planning systems and methods might be implemented.

Although not required, many of the implementations or embodiments will be described in the general context of computer- or processor-executable instructions, such as program application modules, objects, or macros stored on or by nontransitory computer- or processor-readable media and executed by one or more computers or processors (i.e., circuitry) and specialized vehicle motion planning hardware that can perform collision assessments and motion planning operations. Such motion planning operations may include performing a collision assessment on edges of a planning lattice or planning graph or roadmap, determining a probability of collision, setting or adjusting a cost associated with each transition or edge based on the collision assessment and optionally on a parameterized cost function representing a severity of collision or a relative preference ranking of collisions, performing an optimization to identify a path in the planning lattice, planning graph or roadmap to transition between states while avoiding collisions with static and dynamic obstacles, minimizing a probability of collision, or minimizing a cost of collision with static and dynamic obstacles in the environment, for example by finding a least cost path between states in the planning lattice, planning graph or roadmap, and optionally employing such as part of a motion plan executable by the primary agent (e.g., primary autonomous vehicle).

As described herein motion planning via a motion planner typically includes collision assessment or detection and finding a least cost path. The collision assessment or detection, the least cost path finding, or both, could, for example, be implemented on one or more microprocessors or field programmable gate arrays (FPGAs), advantageously allowing for easy reconfigurability. The collision assessment or detection, the least cost path finding or both could, for example, be implemented on one or more application specific integrated circuits (ASICs), advantageously allow fast processing while still allowing some reconfigurability. Either implementation may advantageously implement or configure respective hardware circuits to perform collision assessments using computationally efficient representations of a primary agent, the primary agent represented for instance as an oriented bounding box, and using computationally efficient representations of obstacles, the obstacles represented for instance as bounding boxes, oriented bounding boxes, or curves. Trajectories of the primary agent may be pre-computed, and advantageously represented as fitted functions, for instance as polynomial functions fitted to a motion conventionally represented by motion equations. This approach may advantageously reduce the computational burden of collision assessment, and may shift a portion of the computational work from runtime to pre-runtime.

When representing a primary agent (e.g., an autonomous vehicle or other type of robot) or an obstacle in the environment (e.g., dynamic obstacles in the form of other vehicles, people or animals), one may represent the environment as a point cloud, and represent respective agents or obstacles as pixels or geometric objects (e.g., bounding boxes, oriented bounding boxes, curves, meshes of polygons). As described herein, the inventors have recognized that it may be computationally advantageous to represent a primary agent (e.g., primary autonomous vehicle) and/or optionally one or more obstacles as boxes (e.g., rectangular prisms, parallelepipeds), for example as two-dimensional oriented bounding boxes, specified for instance by a size, location, and orientation (e.g., front, heading). Due to the fact that vehicles are typically not randomly shaped and travel in what can easily be represented as a direction in a two-dimensional world, there may be a significant advantage to employing two-dimensional oriented bounding boxes to represent the primary agent (e.g., primary autonomous vehicle). Likewise, certain obstacles (e.g., other autonomous vehicles or other vehicles) are typically not randomly shaped and travel in what can easily be represented as a direction in a two-dimensional world, hence there may be a significant computational advantage to employing two-dimensional oriented bounding boxes to represent at least some types of obstacles. Notably, representing obstacles (e.g., vehicles, physical obstacles, logical spacing constructs) as boxes may require far fewer bits (e.g., just the x, y coordinates for two opposite corners of a two-dimensional bounding box). Also, performing intersection tests for two-dimensional bounding boxes may be less computationally intensive than using other representations (e.g., voxel representations) thereby enhancing operation of a processing system. Additionally or alternatively, for certain obstacles (e.g., center line, lane markers, road edges) there may be a significant computational advantage to employing curves to represent at least some types of obstacles. Such curve representation can take a variety of forms, for instance b-spline representations. The same concepts can be extended to the three-dimensional world. Various data structures may be used to represent two-dimensional and three-dimensional surfaces of objects (e.g., vehicles, physical obstacles, logical spacing constructs), such as, for example, Euclidian distance field, binary space partition trees, etc.

In at least one implementation, the collision assessment is performed on relatively simple geometric representations (e.g., bounding boxes, oriented bounding boxes, curves) of primary agents and obstacles, using relatively simple representations of trajectories, for instance represented as fitted functions (e.g., fitted polynomial functions). Collision assessment may be performed via one or more processors (e.g., microprocessor, FPGA, ASIC).

In various implementations, such operations may be performed entirely in hardware circuitry or as software stored in a memory storage, such as system memory 214, and executed by one or more hardware processors 212a, such as one or more microprocessors, digital signal processors (DSPs), field programmable gate arrays (FPGAs), application specific integrated circuits (ASICs), graphics processing units (GPUs) processors, programmed logic controllers (PLCs), electrically programmable read only memories (EEPROMs), or as a combination of hardware circuitry and software stored in the memory storage. For example, performing the optimization to identify a path in the planning lattice to either avoid collision or cause collision with an object in the environment by finding a shortest path within the planning lattice may be performed by a least cost path optimizer 292. In one example, when the least cost path optimizer 292 is implemented with hardware, the topology of the planning graph may also be mapped onto a reconfigurable fabric of hardware units to enable rapid determination of the shortest path. Various solvers can be employed. This mapping involves programming each physical node with the addresses and edge weights of its logical neighbors. This allows the architecture to be reconfigurable to different planning graph topologies. Other implementations may use a mini-processor implemented on an FPGA.

In an alternative implementation, the collision assessment may be performed in parallel on each of the edges of a resulting planning lattice for the vehicle 102 by specialized motion planning hardware, such as the reconfigurable collision detection architecture and other implementations described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS" and in International Patent Application Publication No. WO 2016/122840, filed Jan. 5, 2016, entitled "SPECIALIZED ROBOT MOTION PLANNING HARDWARE AND METHODS OF MAKING AND USING SAME." For example, all or part of such specialized motion planning hardware may be incorporated in or form part of the motion planner 280 and/or collision assessor 288. Also, implementation of various relevant aspects of perception, planning lattice construction, collision detection, setting or adjusting of costs associated with each edge or transition, and path search are also described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS,"; U.S. Patent Application 62/722,067, filed Aug. 23, 2018 entitled "COLLISION DETECTION USEFUL IN MOTION PLANNING FOR ROBOTICS"; and in International Patent Application Publication No. WO 2016/122840, filed Jan. 5, 2016, entitled "SPECIALIZED ROBOT MOTION PLANNING HARDWARE AND METHODS OF MAKING AND USING SAME." Those skilled in the relevant art will appreciate that the illustrated embodiments, as well as other implementations, can be practiced with other system configurations and/or other computing system configurations, including those of robots, hand-held devices, multiprocessor systems, microprocessor-based or programmable consumer electronics, personal computers ("PCs"), networked PCs, mini computers, mainframe computers, and the like. The implementations or portions thereof (e.g., at design time, configuration time, pre-runtime) can be practiced in distributed computing environments where tasks or modules are performed by remote processing devices, which are linked through a communications network. In a distributed computing environment, program modules may be located in both local and remote memory storage devices or media. However, having efficient compute capability for the primary agent 102 (e.g., primary autonomous vehicle) is important to allow the primary agent 102 to respond in real time to changing environments. Commonly deployed solutions to this problem fail on both the performance and power fronts. They may be too slow to allow high degree-of-freedom vehicles and other robots to respond in real time to the environment, and burden the system with powering several CPUs or GPUs. To solve this problem, the computer system 200 shown in the example implementation of FIG. 2 includes a motion planner 280 having a collision assessor 288 on board the primary agent 102 (e.g., primary autonomous vehicle) that employs relatively simple geometric representations of the primary agent and obstacles, and which optionally employs trajectories represented as fitted functions, the fitted functions which may advantageously be determined or computed during a configuration time or pre-run time and provided to the primary agent from an external source. Collision detection may be performed using a collision detection microarchitecture that is fully retargetable, such as FPGA 290. However, other programmable collision detection microarchitectures that include an array of programmable logic circuits or blocks and a hierarchy of reconfigurable interconnects may be used in various alternative implementations, such as an ASIC architecture, or one or more microprocessors with one or more cores. Through a programming phase, the trajectories represented as fitted functions may be applied. The collision assessor 288 may seek to achieve collision avoidance with particular objects and/or to seek to achieve collision with particular objects. The use of reconfigurable processors as the collision assessor 288 effectively removes the limitation that the design be completely specialized to a single vehicle/lattice pair. A least cost path optimizer 292 allows fast calculation of least cost paths, for example, using a distributed Bellman-Ford strategy. The motion planner 280 may also include severity cost adjuster 289, which sets or adjusts values (e.g., costs) associated with various edges based on a severity or perceived severity of potential collisions associated with the respective edge. As described in detail herein, the severity cost adjuster 289 may employ a parametric equation to determine a value (e.g., cost) that represents a severity of a collision, based on a number of collision severity representative parameters and weights for those parameters. Parameters may, for instance represent a type of obstacle, type of collision, speed of collision and/or energy that would be dissipated by the collision.

As noted above, some pre-processing activities (e.g., determination of fitted functions for trajectories otherwise described by relatively computationally difficult to solve motion equations) may be performed before runtime and thus, in some implementations, these operations may be performed by remote processing devices, which are linked through a communications network to the system 200 via network interface 260. For example, a programming phase allows configuration of the processor for the problem of interest (e.g., transitions for each edge of a lattice for a given autonomous vehicle). In such implementations, extensive preprocessing is leveraged to avoid runtime computation. Precomputed data regarding the trajectories (e.g., fitted functions without trigonometric functions) of the primary agent 102 when making the transition in the lattice from one state to another state represented by edges in the lattice is sent to the collision assessor 288 of the motion planner 280. The topology of the lattice may also be mapped onto a reconfigurable fabric of compute circuits or units, such as FPGA 290, to enable rapid determination of the least cost path. The mapping includes programming each physical node of the reconfigurable fabric of compute circuits with the addresses and edge weights of its logical neighbors. This allows the architecture to be targeted to different lattice topologies. During the runtime phase, the sensors 282 send perception data (e.g., point cloud) to the motion planner 280. The perception data may be converted to simplified geometric representations (e.g., bounding boxes, oriented bounding boxes, curves) that represent agents and/or obstacles that are present in the current environment. The collision assessor 288 calculates which motions are likely to involve collision and which are not, updates or sets a cost associated with each of a number of edges, and, upon completion, the results are used by the least cost path optimizer 292 to determine the least cost path. This may advantageously occur without further communication with the sensors 282 or other external components.

The motion planner 280 modifies costs associated with the edges of the lattice accordingly during runtime based on the environment, depending on the goal of the vehicle 102 to avoid or seek collision with particular obstacles in the environment. As explained herein, the costs may also reflect a severity of a collision. The motion planner 280 then runs and returns a resulting path to the actuator system or transmission (e.g., electric motor and drive train, propulsion mechanism, engine) 266.

FIG. 2 shows a computer system 200, such as that for primary agent 102 (e.g., autonomous vehicle), comprising a motion planner 280 and one or more associated nontransitory machine-readable storage media, such as system memory 214 and computer-readable media 226 associated with disk drive 224. The associated nontransitory computer- or processor-readable storage media, including system memory 214 and computer-readable media 226 associated with disk drive 224, is communicatively coupled to the motion planner 280 via one or more communications channels, such as system bus 216. The system bus 216 can employ any known bus structures or architectures, including a memory bus with memory controller, a peripheral bus, and/or a local bus. One or more sensors 282, an object detector 284, an object behavior predictor 286 and an actuator system 266 are also communicatively coupled to the motion planner 280 via system bus 216. One or more of such components may also or instead be in communication with each other via one or more other communications channels, for example, one or more parallel cables, serial cables, or wireless network channels capable of high speed communications, for instance Universal Serial Bus ("USB") 3.0, Peripheral Component Interconnect Express (PCIe) or Thunderbolt®.

The computer system 200 may also be communicably coupled to remote systems, e.g., desktop computer, laptop computer, ultraportable computer, tablet computer, smartphone, wearable computer, (not shown) that are directly communicably coupled or indirectly communicably coupled to the various components of the computer system 200 via the network interface 260. In implementations, the computer system 200 itself, or a portion thereof, may be remote. Such remote systems may be used to program, configure, control or otherwise interface with or input data to the computer system 200 and various components within the computer system 200. Such a connection may be through one or more communications channels, for example one or more wide area networks (WANs), for instance the Internet, using Internet protocols. As noted above, pre-runtime calculations (e.g., initial lattice generation) may be performed by a system that is separate from the primary agent 102 or other type of robot, while runtime calculations may be performed on the primary agent 102 since it is important for the system to be able to update or change vehicle velocity to react in real time or near real time (microseconds) and to a changing operational environment 100.

Some aspects of the construction and operation of the various blocks shown in FIG. 2 are described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS,"; U.S. Patent Application 62/722,067, filed Aug. 23, 2018 entitled "COLLISION DETECTION USEFUL IN MOTION PLANNING FOR ROBOTICS"; and/or International Patent Application Publication No. WO 2016/122840, filed Jan. 5, 2016, entitled "SPECIALIZED ROBOT MOTION PLANNING HARDWARE AND METHODS OF MAKING AND USING SAME." As a result, such blocks need not be described in further detail, as they will be understood by those skilled in the relevant art in view of the references incorporated by reference herein.

The computer system 200 may include one or more processors 212a, 212b (collectively 212), the system memory 214 and the system bus 216 that couples various system components including the system memory 214 to the processors 212. The processors 212 may be any logic processing unit, such as one or more central processing units (CPUs) 212a, digital signal processors (DSPs) 212b, graphical processing units (GPUs), application-specific integrated circuits (ASICs), field programmable gate arrays (FPGAs), programmable logic controllers (PLCs), etc. Such ASICs and FPGAs may be used instead of or in addition to the FPGA 290 of the collision assessor 288 to perform a collision assessment on the edges of a planning graph for the primary agent 102. The reconfigurable collision detection architecture hardware may be, for example, an FPGA 290. However, other programmable collision detection microarchitectures that include an array of programmable logic blocks and a hierarchy of reconfigurable interconnects may be used in various alternative embodiments, such as an ASIC architecture.

The system memory 214 may include read-only memory ("ROM") 218 and random access memory ("RAM") 220. A basic input/output system ("BIOS") 222, which can form part of the ROM 218, contains basic routines that help transfer information between elements within the computer system 200, such as during start-up.

The computer system 200 may include a disk drive 224, which may be, for example, a hard disk drive for reading from and writing to a hard disk, a flash memory drive for reading from and writing to flash memory devices, an optical disk drive for reading from and writing to removable optical disks, or a magnetic disk drive for reading from and writing to magnetic disks. The computer system 200 may also include any combination of such disk drives in various different embodiments. The disk drive 224 may communicate with the processing units 212 via the system bus 216. The disk drive 224 may include interfaces or controllers (not shown) coupled between such drives and the system bus 216, as is known by those skilled in the relevant art. The disk drive 224 and its associated computer-readable media 226 provide nonvolatile storage of computer-readable instructions, data structures, program modules and other data for the computer system 200. Those skilled in the relevant art will appreciate that other types of computer-readable media that can store data accessible by a computer may be employed, such as WORM drives, RAID drives, magnetic cassettes, digital video disks ("DVD"), Bernoulli cartridges, RAMs, ROMs, smart cards, etc.

Program modules can be stored in the system memory 214, such as an operating system 236, one or more application programs 238, other programs or modules 240 and program data 242. Application programs 238 may include instructions that cause the processor(s) 212 to perform collision assessment on edges of a planning lattice corresponding to environment 100. For example, the application programs 238 may include one or more machine-readable instructions that cause the motion planner 280 to use the collision assessor 288 to perform a collision assessment on each of one or more of the edges of a resulting planning lattice for the vehicle 102.

Application programs 238 may include instructions that cause the processor(s) 212 to determine and set or adjust a cost associated with each edge. The cost may represent a probability of collision for each edge of the planning lattice, and/or represent a severity of collision or collision preference ranking cost, determined, for example, via a parameterized cost function (e.g., parameterized severity cost function), and optionally represent inherent costs (e.g., fuel, range, passenger comfort). The instructions may cause the processor(s) 212 to determine the probability of collision and assign or set a respective cost to each edge. The instructions may cause the processor(s) 212 to determine a cost representative of severity of collision or a ranked preference of collisions for example based on a parameterized cost function, and adjust the cost of each edge accordingly. Application programs 238 may, for example, include one or more machine-readable instructions that cause the processor(s) 212 to, based at least in part on an assessment of probability of a collision with one or more dynamic obstacles (104, 112) in the environment 100 in which the primary agent 102 operates, for a planning lattice: determine or set a weight or cost for each edge that at least partially reflects the collision assessment and/or at least partially reflects the parameterized costs associated with any given potential collision associated with a transition represented by each edge of the planning lattice. Application programs 238 may include instructions that cause the processor(s) 212 to perform an optimization to identify a path in a planning lattice to either avoid collision or cause collision with an obstacle in the environment 100 (e.g., dynamic object B 112). Optimization to identify a path in a planning lattice may include finding a least cost path within the planning lattice.

The application programs 238 may include instructions that then cause the processor(s) 212 to send signals to the actuator system 266 to cause the vehicle 102 to implement a motion plan, causing actuators (e.g., electric motors, solenoids, engines) to move according to the motion plan as described herein.

Application programs 238 may additionally include one or more machine-readable instructions that cause the processor(s) 212 to receive perception information from the sensors 282 that represents the environment 100 in which the primary agent 102 (e.g., primary autonomous vehicle) operates. Application programs 238 may additionally include one or more machine-readable instructions that cause the processor(s) 212 to select or determine a type of representation to employ for various agents and/or obstacles, for example selecting oriented bounding box representations for some and curves for other obstacles. Application programs 238 may additionally include one or more machine-readable instructions that cause the processor(s) 212 to represent the primary agent (e.g. autonomous vehicle) and obstacles according to the selected or determined type of representation.

Application programs 238 may additionally include one or more machine-readable instructions that cause the processor(s) 212 to perform other operations of perception (via sensors 282), planning lattice construction, collision detection, cost determination, cost setting or adjustment, and path search as described herein and in the references incorporated herein by reference.

For example, application programs 238 may include one or more processor-executable instructions that cause the processor(s) 212 to receive perception information via sensors 282 that represents the environment 100 in which the primary agent 102 (e.g., primary autonomous vehicle) operates; cause the motion planner 280 to use the collision assessor 288 to perform a collision assessment on each of one or more of the edges of a planning lattice; for each of one or more edges of the planning lattice, set a cost value based in part on a probability of collision based at least in part on the collision assessment and based in part on a parameterized cost function that represents a severity of a possible collision; perform an optimization to identify a path in the resulting planning lattice that provides a longest route of travel of the vehicle 102 as specified by the path with a relatively low potential of a severe collision with one or more dynamic obstacles (e.g., dynamic object B 112) in the environment 100 in which the primary agent 102 operates; and implement a motion plan with the relatively low potential of a collision with one or more dynamic objects (e.g., dynamic object B 112) in the environment 100 in which the primary agent 102 operates based at least in part on the optimization.

Application programs 238 may additionally include one or more machine-readable instructions that cause the processor(s) 212 to perform various other methods described herein, including, but not limited to, those illustrated in FIGS. 6 through 9.

While shown in FIG. 2 as being stored in the system memory 214, the operating system 236, application programs 238, other programs/modules 240, and program data 242 can be stored on associated computer-readable media 226 of the disk drive 224.

The processor(s) 212 may be any logic processing units, such as one or more central processing units (CPUs), digital signal processors (DSPs), application-specific integrated circuits (ASICs), field programmable gate arrays (FPGAs), etc. Non-limiting examples of commercially available computer systems include, but are not limited to, the Celeron, Core, Core 2, Itanium, and Xeon families of microprocessors offered by Intel® Corporation, U.S.A.; the K8, K10, Bulldozer, and Bobcat series microprocessors offered by Advanced Micro Devices, U.S.A.; the A5, A6, and A7 series microprocessors offered by Apple Computer, U.S.A.; the Snapdragon series microprocessors offered by Qualcomm, Inc., U.S.A.; and the SPARC series microprocessors offered by Oracle Corp., U.S.A.

Figure 3:
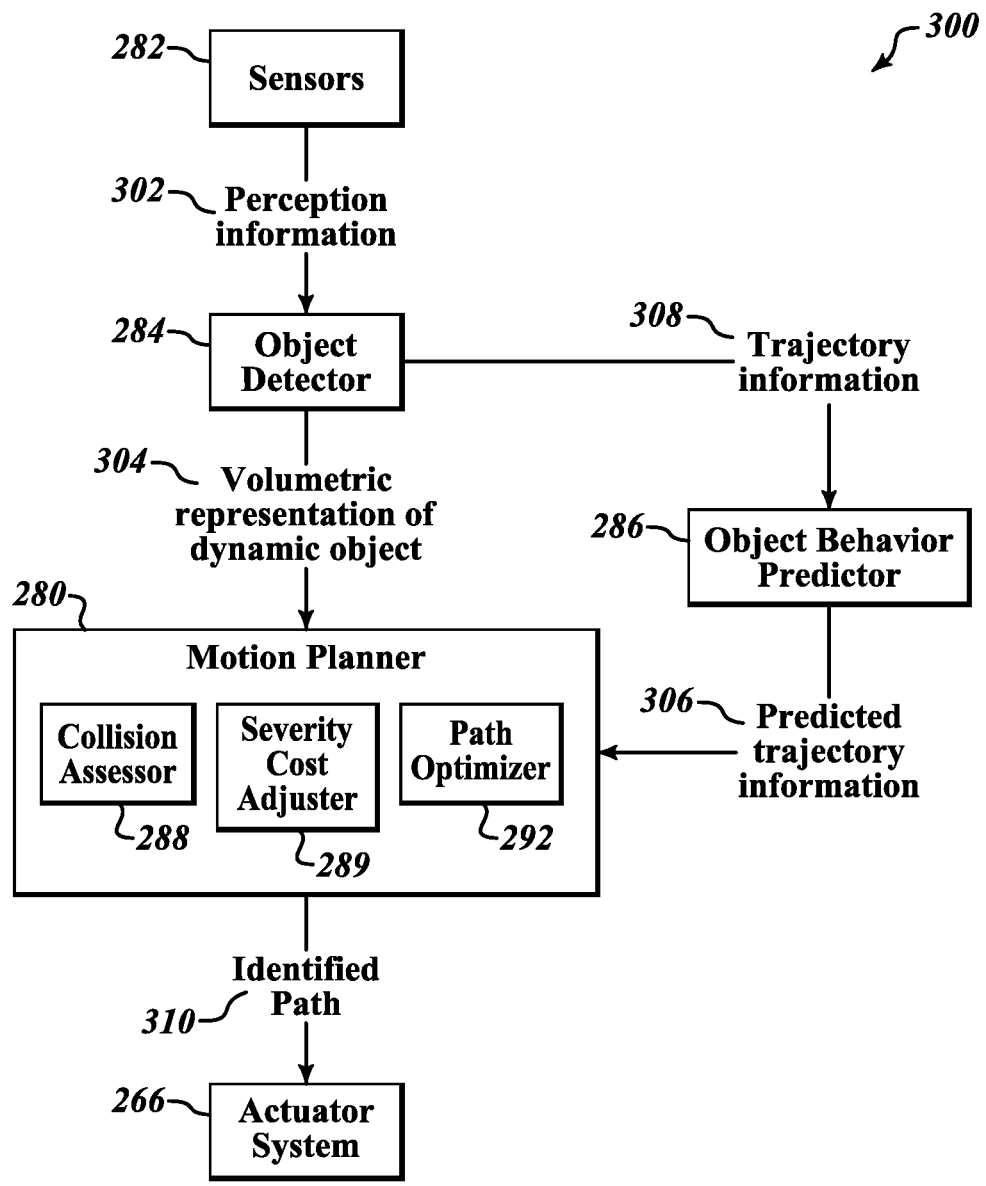
FIG. 3 is a block diagram showing an example data flow between various components of a primary agent (e.g., vehicle) on-board processor-based system and a remote processor-based system that may facilitate motion planning to operate the primary agent (e.g., vehicle) in the operational environment of FIG. 1, according to one illustrated implementation.

FIG. 3 shows an example data flow in a system 300 between various components of a primary agent (e.g., primary autonomous vehicle) on-board processor-based system 300a and a remote processor-based system 300b that may facilitate motion planning to operate the primary agent (e.g., primary autonomous vehicle) in the operational environment of FIG. 1, according to one illustrated implementation. The primary agent (e.g., primary autonomous vehicle) on-board processor-based system 300a may be similar to or incorporate an instance of the processor-based system 200 (FIG. 2). The remote processor-based system 300b may be similar to or incorporate an instance of the processor-based system 200 (FIG. 2).

The remote processor-based system 300b may generate or determine fitted functions that represent the trajectories for each of a number of edges, the edges which represent transitions between states of a vehicle, where the states are represented as nodes in a planning lattice. While transitions are conventionally represented via motion equations, assessing collisions using motion equations is computationally intensive (e.g., employing trigonometric functions). In at least one implementation, a processor-based system may generate a set of fitted functions based on the motion equations, for each of a number of trajectories. The fitted functions may represent the trajectory as a curve, and may advantageously avoid the inclusion of trigonometric functions. The processor-based device may, for example, determine the fitted functions (e.g., fitted polynomial functions) offline, during a configuration time that occurs before a runtime. The processor-based device may, for example, determine the fitted functions based on information (e.g., wheel base, turning radius) supplied by an original equipment manufacturer (OEM) and may even be determined or generated by the OEM. Use of fitted functions may provide a more computationally efficient approach to collision assessment than the use of conventional motion equations.

One or more sensors 282, such as cameras, laser sensor equipment, audio sensors, etc., either incorporated within the primary agent 102 or in operable communication with the primary agent 102, collect perception information 302 and communicate this to the object detector 284 to produce a model (e.g., point cloud) of the environment 100. The object detector 284 extracts trajectory information regarding detected movement of agents, such as dynamic obstacle A 104 and dynamic obstacle B 112 in the environment 100, and communicates such trajectory information 308 to object behavior predictor 286. Based at least in part on the current detected trajectory of the dynamic obstacle (104, 112) in the environment 100 as indicated by the trajectory information 308, object behavior predictor 286 generates one or more predicted trajectories of the dynamic obstacle (104, 112) and communicates this information as part of the predicted trajectory information 306 to the motion planner 280. For example, if the trajectory information 308 indicates dynamic obstacle A 104 is currently on a trajectory heading in a particular direction, the object behavior predictor 286 may predict with 40% probability that dynamic obstacle A 104 will continue in its current trajectory, with 60% probability it does something else.

Various factors may influence the determination of the object behavior predictor 286 of the predicted trajectory of a dynamic obstacle (104, 112) in the environment 100. For example, in some implementations, it may be indicated or determined that a dynamic obstacle (104, 112) has a goal that will affect its future movement within environment 100. As one example, it may be indicated or determined that dynamic obstacle A 104, which is detected to be currently on a trajectory directly away from the primary agent 102, has a goal to get away (and stay away) from primary agent 102. Therefore, the object behavior predictor 286 may take this into consideration when predicting the movement of dynamic obstacle A 104. On the other hand, it may be indicated or determined that dynamic obstacle B 112, which is detected to be currently on a trajectory directly toward the primary agent 102, has a goal to collide with primary agent 102. Therefore, the object behavior predictor 286 may take this into consideration when predicting the movement of dynamic obstacle B 112.

Additionally, the movement of the other obstacles (e.g., other agents or other autonomous vehicles, people, animals) may be affected by a change in a trajectory of the primary agent 102. Therefore, the object behavior predictor 286 may take a planned, and not yet implemented or performed, change in a current trajectory of the primary agent 102 into consideration when determining a predicted trajectory of a dynamic obstacle and include such data in the predicted trajectory information 306 provided to the motion planner 280. For example, if it is indicated or determined that dynamic obstacle B 112, which is detected to be currently on a trajectory directly toward the primary agent 102, has a goal to collide with primary agent 102, it may be predicted that if primary agent 102 changes its trajectory, dynamic obstacle B 112 may make a corresponding change in its trajectory to chase primary agent 102. Thus, if primary agent 102 has a goal to reach a destination within environment 100 without colliding with dynamic obstacle B 112 (that is trying to collide with the primary agent 102), then the motion planner 280 may be able to plan a path to the destination to avoid collision with dynamic obstacle B 112, taking into consideration dynamic obstacle B 112 may make a corresponding change in its trajectory to chase primary agent 102 when primary agent 102 changes its trajectory to reach the destination.

Overall, the system may perform perception by the use of a combination of the sensors 282 and processing performed by the object detector 284 and object behavior predictor 286 to produce a model of the environment 100. In one implementation, the sensors 282 produce digital representations, for example an oriented bounding box, an occupancy grid or a curve. An oriented bounding box is a parallelepiped with a direction and dimensions (e.g., two points at diametrically opposed corners). A point cloud or an occupancy grid are data structures representing which regions of space and time contain obstacles in a discretized view of the environment, such as environment 100. Each discretized region of space is termed a "pixel" if two-dimensional. In cases where transit in a three-dimensional world can be effectively treated as transit in two-dimensions (e.g., ground based vehicles on conventional streets, roads and/or highways), it may be advantageous to represent objects as two-dimensional bounding boxes, for example two-dimensional oriented bounding boxes. In cases of transit in three-dimensions, it may be advantageous to represent the objects as three-dimensional boxes (rectangular prisms) rather than two-dimensional boxes. A curve may be represented, for example, as a spline, a b-spline, or any other parametric representation of a curve.

The areas or regions of space occupied by the obstacles in the environment, including dynamic obstacles A 104, dynamic obstacles B 112 and static obstacles C 108 (FIG. 1), are represented by digital representations, e.g., represented by two-dimensional bonding boxes, two-dimensional oriented bonding boxes, curve representations. The digital representation of one or more dynamic obstacles (e.g., dynamic obstacles A 104 and dynamic obstacles B 112), as well as volumetric representation of relevant static obstacles are communicated to the motion planner 280 from the object detector 284. Construction of digital representations of obstacles or objects is described in the vast body of published literature available and known to those of ordinary skill in the art of computer vision and sensing.

The motion planner 280 receives perception data including representations of dynamic and static obstacles from the object detector 284 and predicted trajectory information from the object behavior predictor. The motion planner 280 then adjusts a cost value along each edge in a planning lattice based on the collision assessment, for example to account for the predicted trajectories, and optionally based on a parameterized cost function that represents severity of collisions or ranked preference of collisions, determines a path considering cost and probability of collision, and outputs the path to the computing system.

The motion planner can include a hardware processor and memory storage as part of a collision assessor 288 within the motion planner 280. For example, FPGA 290 or other array of programmable logic blocks can store a planning lattice, also referred to herein as a "roadmap" (see, e.g., FIG. 4). In some implementations, the motion planner 280 includes hardware collision detection circuits, such as FPGA 290, to perform collision detection. In some implementations, the motion planner 280 includes reconfigurable collision detection acceleration. Data regarding the environment in which the primary agent 102 operates can be stored at a memory storage of the collision assessor 288 of the motion planner 280 such that during motion planning, as perception data is received, possibly include information regarding a predicted trajectory of a dynamic obstacle, the perception data is compared by a hardware processor of the collision assessor 288 to assess collisions. During runtime operation, the edges of the planning graph can be assigned information (e.g., cost values) based on one or more variables. For example, in the case where the goal of the primary agent 102 is to avoid collisions with dynamic obstacle A 104, based on predictions of where the dynamic obstacle A 104 is headed according to the predicted trajectory information 306, the motion planner 280 will generate a motion plan for primary agent 102 to avoid or minimize risk of collision with dynamic obstacle A 104, in at least some implementations taking into account not only the probability or likelihood of collision but also a parameterized cost function specifying severity of collision (e.g., collision with inanimate object preferred over collision with animate object, collision with logical space construct (for instance a courtesy region) preferred over collision with physical object, collision at lower speeds preferred over collisions at higher speeds, collisions at certain orientations preferred over collisions at other orientations). The parameterized cost function may advantageously allow an OEM, operator or end use to specify the parameters and weights for each parameter.

Figure 4:
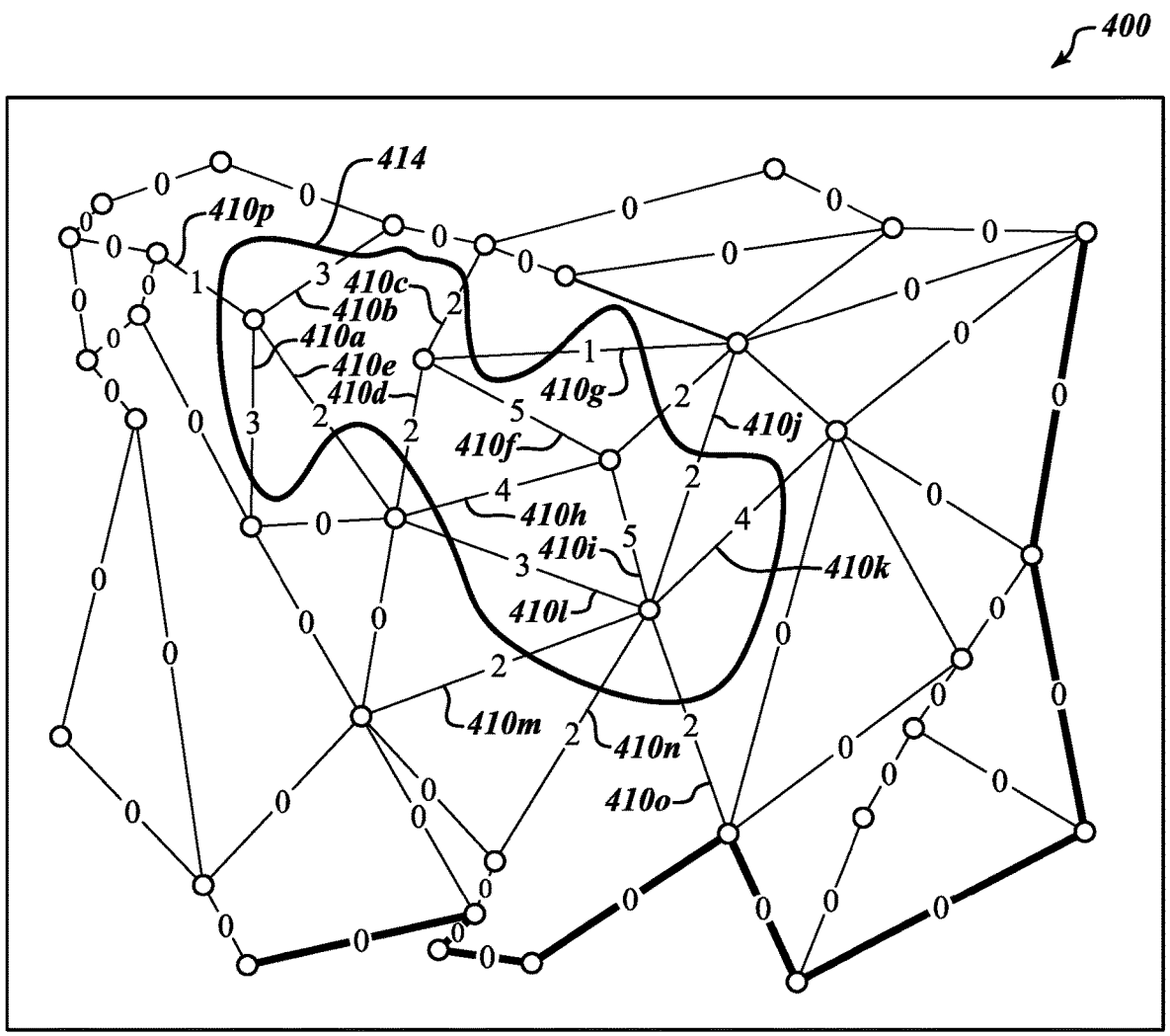
FIG. 4 is an example motion planning lattice for the primary agent (e.g., autonomous vehicle of FIG. 1) in the case where the goal of the primary agent is to transition from one state to another state while avoiding collisions with dynamic obstacles and static obstacles in the operational environment, according to one illustrated implementation.

To do this, the collision assessor 288 evaluates at least one of the edges in the planning graph for the likelihood of collision with dynamic obstacle A 104. Note that the environment 100 is the two- or three-dimensional space in which the primary agent 102 operates, and is different than the primary agent's "configuration space" referenced below with respect to the motion planning lattices represented in FIG. 4. The primary agent's configuration space is the space of all configurations of the primary agent 102 that characterize a state of the primary agent, typically a multi-dimensional space, e.g., with more than three dimensions. The edges in the planning lattice 400 represented in FIG. 4 represent transitions between configurations of the primary agent 102. The edges of planning lattice 400 do not necessarily represent actual movements in Cartesian coordinates. The edges of planning lattice 400 may also include velocity changes, etc.

Each edge of the planning lattice 400 represents a transition of the primary agent from one state to another state and has an inherent or operational cost associated with it. For example, the inherent or operational cost may be related to fuel usage, time to execute the associated action, wear and tear associated with the action, and/or other factors. In at least some implementations, each edge may be assigned an initial weight corresponding to the inherent or operational cost.

The system sets or adjusts the costs of the edges during runtime to represent a probability of collision with a dynamic obstacle (104, 112) in the environment based at least in part on the collision assessment. The system may perform the adjustment of the costs by modifying the initial assigned weight of each edge based at least in part on the probability of collision. For example, the system may apply a cost function to each edge to perform a mathematical operation based on the initial weight for that edge (i.e., the weight that corresponds to the inherent cost) to obtain a modified weight. This may be done by adding an additional weight to the initial assigned weight based on the probability of collision, by multiplying the initial assigned weight by a probability of collision factor, or by applying some other function or formula involving the probability of collision and the initial weight that corresponds to the inherent cost.

The inherent or operational costs assigned to edges may also be adjusted during runtime to reflect object-specific costs which represent the relative importance and/or severity of avoiding a collision or achieving a collision with an object. These object-specific costs are independent of the inherent or operational costs and independent of the probability of collision. For example, the object-specific cost associated with a collision with a human may be set significantly higher than the object-specific cost associated with a collision with an inanimate object.

In at least some implementations, the motion planner may advantageously employ a parameterized cost function to generate cost values for each edge. The parameterized cost function may include a variety of parameters and associated weights. The parameters of the cost function may, for example, represent parameters related to severity of collision or that rank collisions by preference, including, for example: obstacle- or object-specific costs (e.g., object type, for instance human versus inanimate object), collision-specific costs (e.g., collision type, for instance collision with physical object which will result in damage versus collision with road marker or courtesy region which may not result in damage), an indication of speed or an effect of speed (e.g., primary vehicle absolute speed, relative speed between primary vehicle and obstacle) on the severity of collision, and/or a representation of dissipated energy (i.e., energy that would be dissipated by the collision). In at least some implementations, parameters and/or weights are selected or assigned via OEMs. In at least some implementations, parameters and/or weights are selected or assigned via vehicle owners or those responsible for operation of autonomous vehicles, or even by governmental authorities or insurance industry standards organizations.

For simplicity of illustration in FIG. 4, all initial weights corresponding to the inherent cost of each edge have been set to zero and adjusted by adding an additional cost indicative of probability of collision and indicative of a cost value generated from the parameterized cost function to represent obstacle- or object-specific costs, collision-specific costs, and speed as weighted by the assigned weights. Thus, in one implementation in which the goal of the primary agent 102 is to avoid collision with a dynamic object in the environment (such as dynamic object B 112), a greater probability of collision may result in an adjusted edge weight having a larger positive value. A collision with an obstacle that represents a human may result in a larger positive value assigned to a corresponding edge than a collision with an inanimate object. A collision with an obstacle that represents a physical object (e.g., wall) where damage is likely to result may result in a larger positive value assigned to a corresponding edge than a collision with a lane marker or courtesy region or other spacing set off. Collisions at certain orientations may be preferred over other orientations, for example due to the ability of a vehicle to absorb or dissipate energy along certain portions (e.g., collapsible zones or crumple zones) without harm occurring to the occupants or cargo. Likewise, collisions occurring at higher absolute speeds or higher relative speeds where damage is likely to be more significant may result in a larger positive value assigned to a corresponding edge than a value assigned for a collision at lower absolute speed or lower relative speeds where significant damage is relatively less likely to occur. Likewise, collisions that dissipate less energy may be preferred to collisions that dissipate relatively more energy, since those may result in less damage with all other parameters being equal. In some implementations, OEMs may provide values for some or all parameters and weights, for example based on testing of specific vehicle types (i.e., make and model and year).

Once all edge weights of the planning lattice have been adjusted, the path optimizer 292 performs a least cost path algorithm from the current position of the primary agent 102 indicated in the planning lattice to possible next states or goal states of the primary agent 102. The least cost path in the planning lattice is typically then selected by the motion planner 280.

Once the path optimizer 292 identifies the path within the planning lattice, the motion planner immediately communicates this identified path 310 to the actuator system 266 of the primary agent 102 in real time to generate the corresponding signals to the various motors or movement systems of the primary agent 102 to cause the physical movements of the primary agent 102 to occur to implement the motion plan.

FIG. 4 is an example motion planning lattice 400 for the primary agent 102 of FIG. 1 in the case where the goal of the primary agent 102 is to avoid collision with the dynamic obstacle B 112 of FIG. 1 that is approaching the primary agent, and an example path 412 (including the bolded edges of lattice 400 connecting node 408*a* to 408*i*) identified in the planning lattice 400 for the primary agent 102 to avoid collision with the dynamic obstacle B 112, according to one illustrated implementation.

The planning lattice 400 respectively comprises a plurality of nodes connected by edges. Each node represents, implicitly or explicitly, time and variables that characterize a state of the primary agent 102 in the primary agent's configuration space. The primary agent's configuration space (often called C-space), in the present example, is the space of the configurations of the primary agent represented in the planning lattice 400 that characterize a state of the primary agent 102. For example, each node may represent the configuration of the primary agent 102, which may include, but is not limited to, the current position, pose, velocity and heading of the primary agent 102. In some implementations, the acceleration of the primary agent 102 is also represented by the nodes in the planning lattice 400.

The edges in the planning lattice 400 represent transitions between these configurations of the primary agent 102. The edges of planning lattice 400 do not represent actual movements in Cartesian coordinates, but rather represent transitions between states in C-space. For example, each node may represent the configuration of the primary agent 102, which may include, but is not limited to, the current position, pose, velocity and heading, and optionally acceleration of the primary agent 102. Edges represent transitions between these configurations. Each edge of planning lattice 400 represents a transition of a primary agent 102 between a respective pair of nodes. For example, edge 410a represents a transition of a primary agent 102, between two nodes. In particular, edge 410a represents a transition between a state of the primary agent 102 in a particular configuration associated with node 408b and a state of the primary agent 102 in a particular configuration associated with node 408c. For example, primary agent 102 may currently be in a particular configuration associated with node 408a. Although the nodes are shown at various distances from each other, this is for illustrative purposes only and this is no relation to any physical distance and there is no limitation on the number of nodes in the planning lattice 400. However, the more edges and nodes that are used in the planning lattice 400, the more accurately and precisely the motion planner 280 may be able to determine the optimal path according to the goal of the primary agent 102 since there are more paths to select the least cost path from.

There may be instances where it is desirable for primary agent 102 to avoid dynamic obstacle B 112, such as to avoid collision with dynamic obstacle B 112. FIG. 4 shows how a planning lattice 400 is used by the motion planner 280 to identify a path for primary agent 102 in the case where the goal of the primary agent 102 is to avoid collision with or evade dynamic obstacle B 112. At this point, the motion planner 280 has received perception information that represents the environment 100 in which the primary agent 102 operates.

In one implementation, the environment 100 is discretized into two-dimensional regions of pixels or boxes. Obstacles may be represented digitally, for example, as bounding boxes, oriented bounding boxes, or curves (e.g., splines), which ever digital representation is most appropriate for the type of obstacle and type of collision detection that will be performed, which itself may depend on the specific hardware circuitry employed. In some implementations, the trajectories in the lattice for the primary agent 102 are precomputed. Examples of collision assessment are described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS"; U.S. Patent Application 62/722,067, filed Aug. 23, 2018 entitled "COLLISION DETECTION USEFUL IN MOTION PLANNING FOR ROBOTICS"; and in International Patent Application Publication No. WO 2016/122840, filed Jan. 5, 2016, entitled "SPECIALIZED ROBOT MOTION PLANNING HARDWARE AND METHODS OF MAKING AND USING SAME."

As described above, collision detection for transit in two-dimensions may use pixels or two-dimensional geographic shapes (e.g., two-dimensional boxes, two-dimensional oriented bounding boxes) or other digital representations (e.g., curves) to represent obstacles in the environment, including dynamic obstacle B 112. Pixels or boxes may be used to represent primary agent 102 to the motion planner 280, preferably an oriented bounding box may be employed to represent vehicles. It should be understood, however, that other object representations may be used. In one implementation, the environment is discretized into a point cloud, and the primary agent and obstacles are represented as geometric objects (e.g., oriented bounding boxes, curves) or other digital representations. Then, trajectories associated with edges are assessed for collisions with the representations of obstacles. A collision at a single point along the trajectory may be sufficient to identify the entire trajectory, and hence corresponding edge, as being in collision or having a relatively high likelihood of collision.

Due to the fact that dynamic obstacle B 112 is moving in the environment 100, the motion planner 280 also determines a collision assessment of primary agent 102 with dynamic obstacle B 112 for two or more edges in the planning lattice 400 based on predictions of where dynamic obstacle B 112 is headed. For each of these edges of the planning lattice 400, the motion planner 280 sets a probability of collision of the primary agent 102 with the dynamic obstacle B 112 at particular future times based at least in part on the collision assessment. For example, according to the perception information, dynamic obstacle B 112 is detected to be at a particular position in the environment 100. Based on the current trajectory 106 of dynamic obstacle B 112, the motion planner 280 determines that the dynamic obstacle B 112 will be at a particular position in the environment 100. For nodes in the planning lattice 400 where there is a probability that direct transition between the nodes will cause a collision with dynamic obstacle B 112, the motion planner assigns a weight to the edges of the planning lattice 400 transitioning between those nodes (edges 410a, 410b, 410c, 410d, 410e, 410f, 410g, 410h, 410i, 410j, 410k, 410l, 410m, 410n, 410o and 410p) indicating the probability of a collision with dynamic obstacle B 112. In the example shown in FIG. 4, this is denoted as graph portion 414, but does not correspond to a physical area.

For example, the motion planner 280 may, for each of a number of edges of the planning lattice 400 that has a respective probability of a collision with dynamic obstacle B 112 above a defined threshold probability of a collision, assign a weight with a value greater than zero. In the present example, the motion planner 280 has assigned a weight of zero to those edges in the planning lattice 400 which, according to the current trajectory of the dynamic obstacle B 112, do not have any (or have very little) probability of a collision with dynamic obstacle B 112. The motion planner 280 then, for each of a number of edges of the planning lattice 400 with a respective probability of a collision with dynamic obstacle B 112 in the environment 100 above the defined threshold probability of a collision, assigns a weight with a value greater than zero. In the present example, the motion planner 280 has assigned a weight of greater than zero to those edges in the planning lattice 400 which, according to the current trajectory of the dynamic obstacle B 112, have a higher probability of collision with dynamic obstacle B 112. The particular threshold used for the probability of collision may vary. For example, the threshold may be 40%, 50%, 60% or lower or higher probability of collision. Also, assigning a weight with a value greater than zero may include assigning a weight with a magnitude greater than zero that corresponds with the respective probability of a collision. For example, as shown in the planning lattice 400, the motion planner has assigned a weight of 5 to edges 410f and 410i that have a higher probability of collision, but has assigned a weight with a lower magnitude of 1 to edges 410p and 410g, which the motion planner 280 determined have a much lower probability of collision.

The motion planner 280 may assign, set or adjust weights of each edge based on a parameterized cost function that, for example, represents a severity or perceived severity of a collision. The parameterized cost function may be composed of a number of parameters, with associated weights. Parameters may include, for example, obstacle type, collision type, and speed. Parameters may have Boolean values, binary values, integer values, real number values, and/or other types of values. For example, obstacle type may represent a type of obstacle (e.g., person, animal, vehicle with people, autonomous vehicle without people, inanimate object) or a respective value that maps to a type of obstacle. Obstacles that represent people or the presence of people may have a higher associated costs than inanimate obstacles. Also for example, collision type may represent a type of collision (e.g., hard collision with physical object that will or will likely result in damage to the primary vehicle or the obstacle; soft collision with a physical object that will not result in damage or will likely not result in damage or with a logical construct representing a space or area such as a courtesy region around other vehicles or a lane marker; head on collision, T-bone collision, collision where airbags or other safety equipment will deploy, collisions where a relatively protected portion of a vehicle will bear the brunt of the impact versus collisions where a relatively unprotected portion of a vehicle will bear the brunt of the impact) or a respective value that maps to a type of collision. For instance, many passenger vehicles are assessed and rated for different types of collisions or crashes. Such ratings may assess or reflect the expected damage to the vehicle from a given type of collision and/or may assess or reflect that relative safety of occupants of the vehicle for a given type of collision. Some vehicles, including autonomous vehicles which may or may not carry passengers, may have relative higher collision rating (e.g., crash ratings) for some type of impacts versus other types of impacts. Also for example, speed may represent an absolute speed of the primary vehicle, absolute speed of an obstacle, or relative speed of the primary vehicle relative to an obstacle, or a respective value that maps to an indication or absolute or relative speed (e.g., low speed, medium speed, high speed). Also for example, an amount of energy that is expected to be dissipated as part of the collision may be a parameter, either in lieu of or in addition to speed. The amount of energy to be dissipated is typically a function of speed. Weights may, for example take the form of percentages, fractions or decimal values, and may total to 100% or 1.

After the motion planner 280 sets a probability of collision of the primary agent 102 with the dynamic obstacle B 112 based at least in part on the collision assessment, the motion planner 280 performs an optimization to identify a path 512 in the resulting planning lattice 500 that provides a route of travel of the primary agent 102 as specified by the path with a relatively low potential of a collision with dynamic obstacle B 112.

In one implementation, once all edge costs of the planning lattice 400 have been assigned as shown in FIG. 4, the motion planner 280 may perform a calculation to determine a least cost path to or toward a goal state represented by a goal node. For example, the motion planner 280 may perform a least cost path algorithm from the current state of the primary agent 102 in the planning lattice 400 to possible final states. The least cost (closest to zero) path in the planning lattice 400 is then selected by the motion planner 280. As explained above, cost may reflect not only probability of collision, but also the severity of collision, as well as other factors. In the present example, the current state of the primary agent 102 in the planning lattice 400 is at node 408a, and this path is depicted as path 412 (bolded line path comprising segments extending from node 408a through node 408i) in the planning lattice 400.

Although shown as a path in planning lattice 400 with many sharp turns, such turns do not represent corresponding physical turns in a route, but logical transitions between states of the primary agent 102. For example, each edge in the identified path 412 may represent a state change with respect to physical configuration of the primary agent 102 in the environment 100, but not necessarily a change in heading of the primary agent 102 corresponding to the angles of the path 412 shown in FIG. 4.

Various processes for determining the least cost path may be used, including those implementing the Bellman-Ford algorithm, but others may be used, including, but not limited to, any such process in which the least cost path is determined as the path between two nodes in the planning lattice 400 such that the sum of the costs or weights of its constituent edges is minimized. This process improves the technology of motion planning for a primary agent, e.g., an autonomous vehicle, for collision with dynamic objects (104, 112) by using planning lattices and collision detection to increase the efficiency and response time to find the best route to collide with the desired object. Additionally, some implementations use the same process of identifying a path for the primary agent 102 with a relatively high potential of a collision with one or more obstacles in the environment in which the primary agent 102 operates. In cases where the collision is sought with such obstacles, the motion planner 280 may assign a cost or weight having a large negative value for edges of the planning lattice 400 having a respective probability of a collision with the obstacle in the environment 100. In this manner, when the motion planner selects the least cost path during optimization, such paths will be more likely to be selected. In such implementations, where the obstacle is static, there is no velocity, trajectory or acceleration of a static obstacle that need be accounted for.

This process improves the technology of motion planning for avoiding collision with dynamic objects by using planning lattices and collision detection to increase the efficiency and response time to find the best route to avoid collision with the dynamic object. Additionally, some implementations use the same process of identifying a path for the primary agent 102 with a relatively low potential (e.g., zero) of a collision with one or more static objects in the environment in which the primary agent 102 operates. In cases where the collision is to be avoided with such static obstacles, the motion planner 280 assigns a cost or weight a value that is relatively high for each of a number of edges of the planning lattice 400 that has a respective probability of a collision with the static object in the environment 100. In this manner, when the motion planner selects the least cost path during optimization, paths having edge costs set to relatively high values will be avoided since there is no uncertainty that there will be collision with the obstacle if that edge is traversed. In such implementations, however, a collision with a static obstacle may be preferred over a collision with another obstacle, for example where the static obstacle is inanimate or a road marking or spacing preference, and the other obstacle is a human, or the other obstacle is moving at a relatively high speed relative to the primary agent or primary vehicle and thus a collision may be expected to produce severe adverse consequences.

In some implementations, there may be multiple other agents, e.g., dynamic obstacles (104, 112). In such implementations, the processes described herein for the primary agent 102 to avoid collision with dynamic obstacles (104, 112) may be implemented concurrently, simultaneously or otherwise in conjunction with each other. For example, some obstacles may be identified as obstacles to avoid collision with. The motion planner 280 then runs optimizations as described herein, accordingly taking into consideration the trajectories and perception information corresponding to the dynamic and static obstacles and whether such objects are to be avoided and the relative severity of collision with the obstacle at some given speed. In such a case, setting the probability of collision for the edges of the planning lattice based on the collision assessment includes assigning costs or weights (e.g., by modifying/adjusting an initial cost or weight) to avoid collision or severe collision accordingly.

The motion planner 280 may perform the optimization to identify a path in the resulting planning lattice 400 with a lowest potential of a collision with dynamic obstacle B 112 along an entire route of the primary agent 102, taking into account an assessment of various parameters indicative of a predicted severity of the collision. The path may also be identified based on a change or predicted change in the trajectory 106 of dynamic obstacle B 112. At each change or predicted change in the trajectory 106 of dynamic obstacle B 112, the collision assessment and optimization process may be run again in real time or near real time. Also, the resulting planning lattice 400 may have data which represents the physical or performance constraints of the primary agent and/or dynamic obstacle, the acceleration, the pitch, the roll and the yaw of the primary agent 102, and in some implementations, also of the dynamic obstacle B 112. The optimization to identify the path may then be performed based on such variables. For example, if the pitch, the roll and/or the yaw of dynamic obstacle B 112 changes, this may indicate a change (or result in a predicted change) in trajectory of dynamic obstacle B 112.

The motion planner 280 can be programmed for a wide range of autonomous vehicles and robots (with and without appendage(s)) and expected task scenarios. The motion planner 280 can be reused, or reprogrammed, for different vehicles or robots or the motion planner 280 can be designed for a specific vehicle or robot. One type of robot is an autonomous vehicle, such as the autonomous vehicle described herein.

Figure 5:
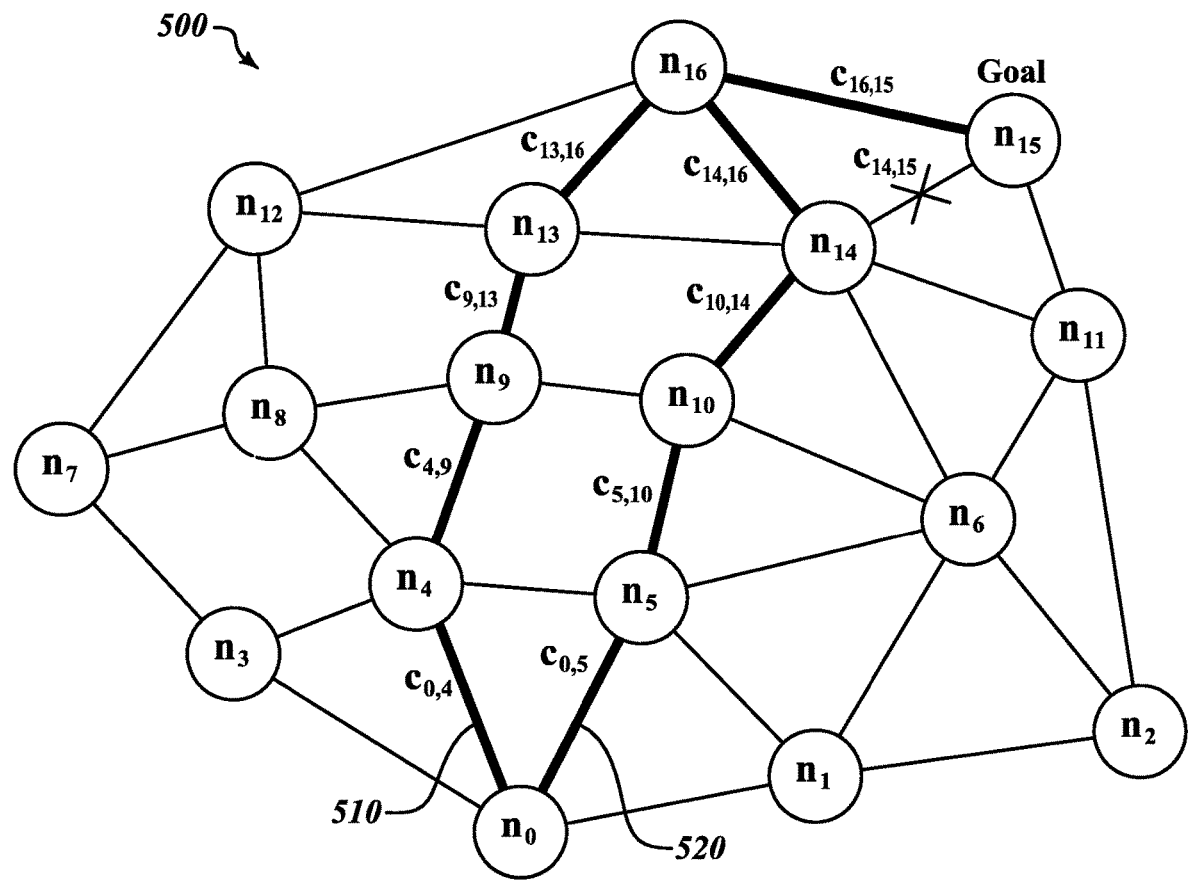
FIG. 5 is an example motion planning lattice for the primary agent (e.g., autonomous vehicle), showing an example of a least-cost path through each of two candidate nodes with costs for each of the edges set or adjusted to represent a collision assessment determined based on known or predicted trajectories of the other agents (e.g., other vehicle) as well as other obstacles in the environment and also to represent severity of collision based on a parametric cost function, according to one illustrated implementation.

FIG. 5 is an example motion planning lattice 500 for the primary agent 102 (e.g., autonomous vehicle). Each node (e.g., $n_0, n_1, n_2 \ldots$) in the lattice 500 may have a respective associated value (e.g., cost, weight) based on a cost associated with edges of the lattice (e.g., $c_{0,4}, c_{0,5}$, etc.) between the node and a goal (e.g., final state) of the primary agent 102. As explained herein, cost can reflect a probability or likelihood of collision, as well as a representation of a severity of the collision, based for instance on the type of obstacle, type of collision and/or speed of collision or energy that would be dissipated during the collision process.

In some implementations, the lattice 500 may be initialized by performing static background collision detection to find edges which are in collision with static obstacles (e.g., static obstacle C 108). In such a case, a respective cost may be assigned (or a cost function may be applied) to an edge which has been determined to result in a collision with a static obstacle (e.g., edge between $n_{14}$ and $n_{15}$), resulting in that edge being associated with or assigned a relatively high cost. For example, the cost may be set to one hundred thousand, thereby effectively deterring the trajectory of the primary agent 102 from including the edge identified as colliding with the static obstacle. The cost assigned to or associated with each edge may be set or adjusted based on a parameterized cost function, the parameterized cost function which represents a severity or perceived severity of collision or ranking of collision types by preference, weighting various aspects (represented as parameters) of collision (e.g., type of obstacle, type of collision, speed of collision or dissipated energy), and essentially ranking some collisions as more disfavored than other collisions. For example, where two collisions have an equal likelihood of occurring, one may have a much higher cost than the other, for instance where one represents a collision with a human or human occupied vehicle and the other represents a collision with an inanimate object. Likewise, the cost function may return a higher cost value for a collision at a higher relative speed than for a collision at a lower relative speed, even though both collisions have the same likelihood of occurring.

In some implementations, assigning or setting or otherwise associating a cost value to an edge may be performed in a single act, the cost value representing both an assessed probability of collision and an assessed severity of collision. Thus, in some implementations a parameterized cost function may include a parameter that represents the probability of collision, and optionally a respective weight to adjust how much influence the probability of collision has relative to the severity related parameters. In other implementations, a respective cost may be assigned to each edge that represents a respective probability of collision associated with the transition represented by the edge, and the cost value may be adjusted or refined based on a cost function that represents a severity of the collision. In some implementations, the cost value representing the severity may be summed with the value that represents probability of collision. In other implementations, the value that represents probability of collision may be multiplied by the cost value representing the severity.

In a second aspect of the initialization of the lattice 500, a cost to goal is determined for each node based, e.g., on a least-cost path from the node in question to the goal node (e.g., $n_{15}$). For example, the cost of node $n_{13}$ may be determined by the cost ($c_{13,16}$) of the edge between $n_{13}$ and $n_{16}$ and the cost ($c_{16,15}$) of the edge between $n_{16}$ and $n_{15}$.

Motion planning for the primary agent 102 using the lattice 500 depicted in FIG. 5 may be performed beginning at time T=i, at a node denoted n (e.g., n0). As explained above, motion planning may advantageously take into account the assumed or inferred intentions of the other agents, e.g., dynamic obstacles (104, 112), in the environment 100 of the primary agent 102. The assumed or inferred intentions may be sampled, e.g., using behavioral models based on probabilistic functions, to produce a trajectory t for each agent $A_j$, resulting in a set S of trajectories. As explained in further detail below, least cost paths are determined as each trajectory t is individually applied to the lattice 500 and then an averaging of costs may be performed. This is in contrast to approaches in which an entire set of trajectories is applied to a motion planning lattice before a least cost path is determined.

For each trajectory t in S, a determination is made as to which edges, if any, in the motion planning lattice 500 collide with the trajectory, i.e., which edges will result in the primary agent 102 colliding with another agent corresponding to the trajectory t. The cost values of these edges are modified, e.g., by applying a cost function that determines a cost associated with a collision, such as, for example, a function which results in a high value being assigned to the edge in collision, and even higher values being assigned to edges in collision with relatively higher predicted severity collision outcomes than those with relatively lower predicted severity collisions.

The costs of the edges of the lattice 500 are modified based on a trajectory t and optionally modified based on the parametric cost function (the parametric cost function which represents a predicted severity collision outcome or assessment). After the costs of the edges have been modified, a cost is computed for each of the candidate nodes n' (i.e., the nodes reachable from the current node n (e.g., $n_0$) in a single time step (i.e., at time T=i+1)). The cost of a candidate node n' (e.g., $n_3$, $n_4$, $n_5$, and $n_1$) is computed by finding a least-cost path from the current node n (e.g., $n_0$) to goal (e.g., $n_{15}$) passing through the candidate node n'. FIG. 5 shows an example of a first least-cost path from node no to goal (node $n_{15}$) which passes through candidate nodes $n_4$, $n_9$, $n_{13}$ and $n_{16}$ (shown in bolded line) and a second least-cost path from node no to goal which passes through candidate nodes $n_5$, $n_{10}$, $n_{14}$, and $n_{16}$ (also shown in bolded line). In these examples, the cost of node n4, for trajectory t, would be the sum of the edges along the first path (e.g., $C_{0,4}$, $C_{4,9}$, $C_{9,13}$, $C_{13,16}$, $C_{16,15}$).

The costs of the candidate nodes n' are computed in the above manner for each trajectory ($t_1$, $t_2$, ... $t_m$) in the set of trajectories, each trajectory corresponding to an agent $A_j$ (j=1 to m), where m is the number of other agents. The costs may be averaged over the set of trajectories to provide an average cost for each candidate node n'. The candidate node n' with the lowest average cost is selected as the next node for the primary agent. Therefore, at time T=i+1, the candidate node n' with the lowest average cost becomes the current node n for the next time step, T=i+2. This continues until the primary agent 102 reaches the goal node (e.g., $n_{15}$), i.e., achieves the state represented by the goal node.

Figure 6:
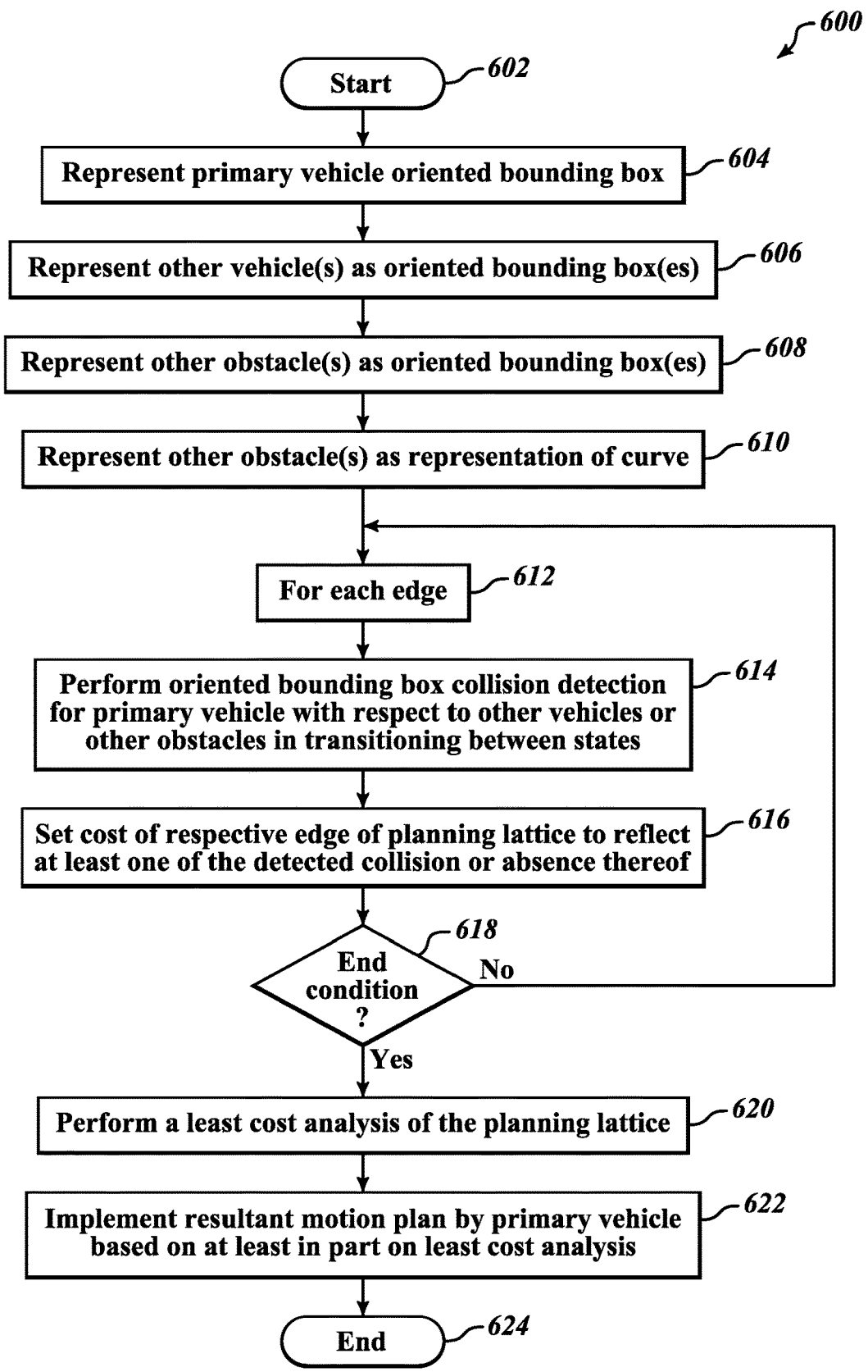
FIG. 6 is a flow diagram showing a method 600 of operation in a processor-based system to implement motion planning, according to at least one illustrated implementation.

FIG. 6 is a flow diagram showing a method 600 of operation in a processor-based system to implement motion planning, according to at least one illustrated implementation.

The method 600 may start at 602, for example, in response to a call or invocation from a calling routine, or in startup of a processor-based system or portion thereof, or in receipt of updated information that characterizes an operational environment including static obstacles, dynamic obstacles, and a state of the vehicle.

At 604, the processor-based system represents a primary vehicle, preferably as a respective oriented bounding box. In doing so, the processor-based system may determine or specify the parameters (e.g., corners, dimensions, direction) of the respective oriented bounding box, or may receive the parameters for the respective oriented bounding box for the vehicle from an entity, for instance an original equipment manufacturer (OEM) who manufactured the vehicle and/or from an OEM processor-based system.

Optionally at 606, the processor-based system represents one or more dynamic obstacles (e.g., other vehicles) in digital form. For example, obstacles with a defined form or shape, for instance a vehicle, may be advantageously represented as a respective oriented bounding box. Additionally or alternatively, a courtesy space that surrounds a vehicle or other moving obstacle may be represented as an oriented bounding box.

Optionally at 608, the processor-based system represents one or more static obstacles in digital form. For example, obstacles with a defined form or shape may be represented as a respective bounding box, or some other digital form.

Optionally at 610, the processor-based system represents one or more static obstacles as respective curves. For example, it may be advantageous to represent road markers or an edge of the road as a curve. For example, any one or more of a centerline of a road, an edge of a road, a lane marker of a road, or an edge of a road may be digitally represented as a curve (for instance represented as a spline (e.g., b-spline) or other parametric representation).

At 612, the processor-based system may execute a loop or iterative assessment that repeats for each of a plurality of the edges of the planning lattice.

As part of the loop 612, the processor-based system performs oriented bounding box collision detection at 614 to determine whether the primary vehicle represented by the oriented bounding box will collide with representations of obstacles in transitioning between a pair of states. The states are represented by respective nodes of a pair of nodes that are connected by the respective edge of the planning lattice. The obstacles can take the form of static obstacles (e.g., buildings, road markings, edge of road whether marked or not) and/or dynamic obstacles (e.g., other vehicles or other dynamic obstacles).

For example, where an obstacle in the form of another vehicle is represented as a respective oriented bounding box, the system may perform oriented bounding box-oriented bounding box collision detection to determine whether the respective oriented bounding box that represents the primary vehicle will collide with the respective oriented bounding box that represents the at least one of the other vehicles in transitioning between the pair of states represented by respective nodes that are connected by the respective edge of the planning lattice.

Also for example, where an obstacle in the form of a pedestrian is represented as an oriented bounding box, the system may perform oriented bounding box-oriented bounding box collision detection to determine whether the respective oriented bounding box that represents the primary vehicle will collide with the respective oriented bounding box that represents the at least one pedestrian in transitioning between the pair of states represented by respective nodes that are connected by the respective edge of the planning lattice.

Also for example, where an obstacle in the form of roadway markings, median, edge of road, whether or not marked, is represented as a curve (e.g., spline, b-spline, polynomial), the system may perform oriented bounding box-curve collision detection to determine whether the respective oriented bounding box that represents the primary vehicle will collide with the curve that represents the roadway markings, median, edge of road in transitioning between the pair of states represented by respective nodes that are connected by the respective edge of the planning lattice.

As described in more detail herein, the system may perform oriented bounding box collision detection where a set of fitted functions represent the respective trajectory of the primary vehicle corresponding to the respective edge of the planning lattice. In at least some implementations, the system may perform oriented bounding box collision detection via a plurality of distinct hardware circuits.

At 616, the processor-based system sets a cost of the respective edge of a planning lattice to reflect at least one of the detected collision or absence thereof. Setting a cost of the respective edge of a planning lattice to reflect at least one of the detected collision or absence thereof may include setting the cost of one or more of the respective edges of a planning lattice according to a parameterized cost function to reflect the detection of a collision and to reflect a severity of the corresponding collision.

At 618, the processor-based system determines whether an end condition has been met, for example last edge. For example, the processor-based system may determine whether each edge has been processed (e.g., collision assessment performed for a transition represented by each edge), or whether a time-out condition has occurred.

At 620, the processor-based system performs a least cost analysis of the planning lattice. For example, the processor-based system may employ any of a variety of least cost algorithms based on costs logically associated with or assigned to each edge, finding a least cost or best path between states represented by nodes in the planning lattice.

At 622, the processor-based system implements a resultant motion plan by the primary vehicle based at least in part on the least cost analysis. For example, the processor-based system may provide commands to a drive system or transmission of a primary vehicle to cause the primary vehicle to transition between states based on the least cost path, for example sending commands to one or more motor controllers.

The method 600 may terminate at 624, for example until called or invoked again. Alternatively, the method 600 may execute repeatedly or continuously, for instance while the primary vehicle is operating.

Figure 7:
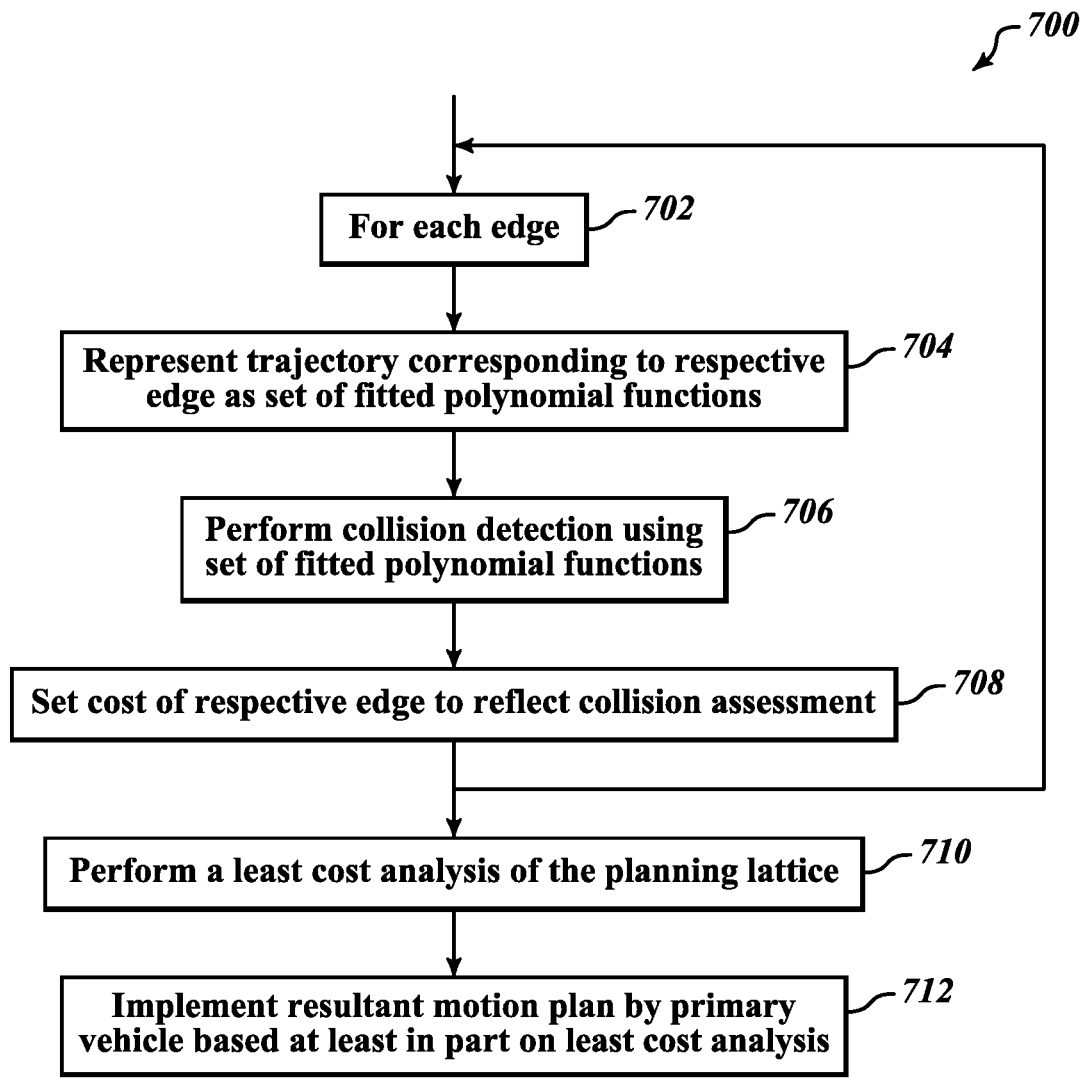
FIG. 7 is a flow diagram showing a method 700 of operation in a processor-based system to implement motion planning, according to at least one illustrated implementation.

FIG. 7 is a flow diagram showing a method 700 of operation in a processor-based system to implement motion planning, according to at least one illustrated implementation.

The method 700 may be executed as part of performing the method 600, for example, as part of performing oriented bounding box collision detection 614 (FIG. 6), or performing other type of collision detection, through implementation of the motion plan 622 (FIG. 6).

At 702, the processor-based system may execute a loop or iterative assessment, repeating for each of a plurality of the edges of the planning lattice.

As part of the loop 702, at 704 the processor-based system represents a trajectory corresponding to a respective edge as a set of fitted functions, for example a set of fitted polynomial functions.

For example, the processor-based system may receive a set of fitted functions (e.g., fitted polynomial functions) at the processor-based system of the primary vehicle from a configuration system. The configuration system may be located remotely from the primary vehicle. The set of fitted functions may have advantageously been fitted by the configuration system during a configuration time, prior to the runtime, when the primary vehicle is not in motion and hence there are no real time constraints on developing the set of fitted functions. The functions may be fitted to a trajectory defined by motion equations. The fitted functions may omit any trigonometric functions, allowing computationally efficient collision assessment. Less advantageously, the processor-based system of the primary vehicle may create or generate a set of fitted polynomial functions.

As part of the loop 702, the processor-based system at 706 performs collision detection using the set of fitted functions to determine whether a representation of the primary vehicle collides with one or more representations of other vehicles or other obstacles.

The system may, for example, perform collision detection for transit in a two-dimensional representation of the environment (e.g., vehicles transiting conventional streets and highways in the real, three-dimensional world) using a pair of fitted polynomial functions, one fitted polynomial function of the pair representing a position in a first dimension with respect to time and the other fitted polynomial function of the pair representing a position in a second dimension relative to a time, the second dimension different than the first dimension. The system may, for example, perform collision detection using a pair of fitted time parametric functions to determine whether the primary vehicle collides with other vehicles or other obstacles. The system may, for example, perform collision detection using a pair of fitted time parametric quintic functions to determine whether the primary vehicle collides with other vehicles or other obstacles. The system may, for example, perform collision detection using a pair of fitted functions that are specific to a make and model of the primary vehicle and provided by an original equipment manufacturer of the primary vehicle. The system may, for example, perform collision detection using a pair of fitted polynomial functions with parameters that are specific to a make and model of the primary vehicle and provided by an original equipment manufacturer of the primary vehicle. The system may, for example, perform the collision detection by representing a respective trajectory of the primary vehicle using the set of fitted functions to represent the respective trajectory of the primary vehicle corresponding to the respective edge of the planning lattice. The system may, for example, perform the collision detection via a plurality of distinct hardware circuits.

At 708, the processor-based system sets a cost of the respective edge of the planning lattice to reflect at least one of the determined collision or absence thereof in transitioning between a pair of states represented by respective nodes that are connected by the respective edge of the planning lattice. The system may, for example, set the cost of one or more of the respective edges of a planning lattice according to a parameterized cost function to reflect the detection of a collision and to reflect a severity of the detected collision.

At 710, the processor-based system performs a least cost analysis of the planning lattice. For example, the processor-based system may employ any of a variety of least cost algorithms based on costs logically associated with or assigned to each edge, finding a least cost or best path between states represented by nodes in the planning lattice.

At 712, the processor-based system implements a resultant motion plan by the primary vehicle based at least in part on the least cost analysis. For example, the processor-based system may provide commands to a drive system or transmission of a primary vehicle to cause the primary vehicle to transition between states based on the least cost path, for example sending commands to one or more motion controllers to control one or more electric motors (e.g., traction motors).

Figure 8:
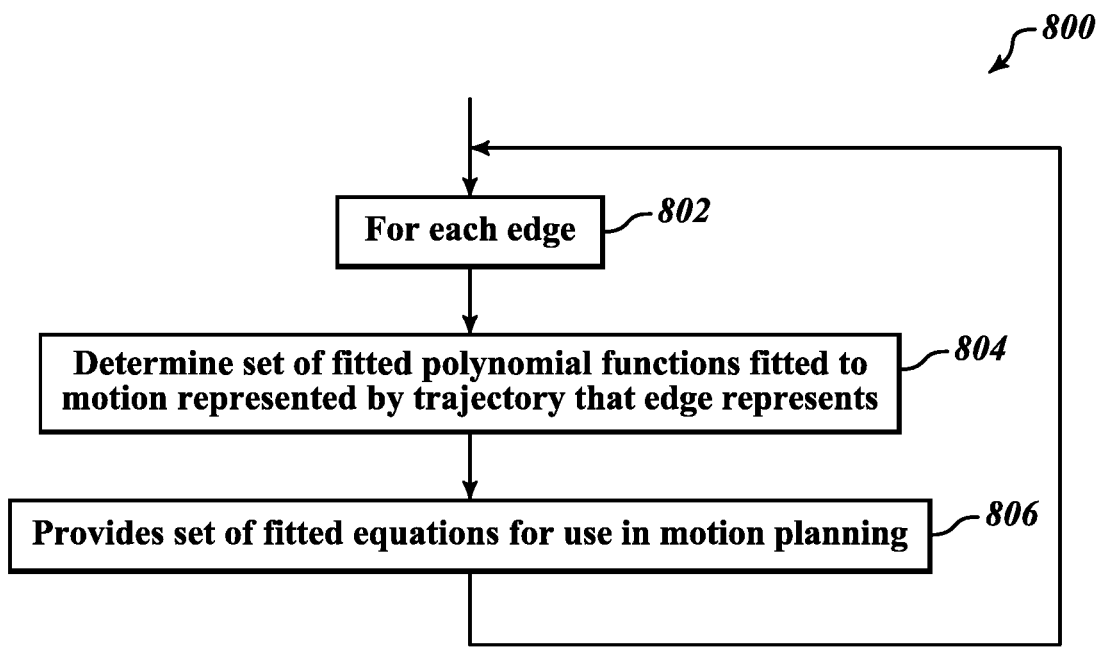
FIG. 8 is a flow diagram showing a method 800 of operation in a processor-based system to implement motion planning, according to at least one illustrated implementation.

FIG. 8 is a flow diagram showing a method 800 of operation in a processor-based system to implement motion planning, according to at least one illustrated implementation.

The method 800 may be executed as part of performing the methods 600, 700, for example, as part of performing collision detection using fitted polynomials 702. The method 800 may be executed during a runtime, for example during operation of the primary vehicle.

At 802, a processor-based system executes a loop, repeating for each of a plurality of the edges of the planning lattice or until some other end condition (e.g., exceeding a maximum amount of time or maximum number of iterations) is reached.

At 804, the processor-based system determines a set of fitted polynomial functions fitted to a motion represented by a trajectory that a respective edge represents. One of ordinary skill in the art will recognize that trajectories may be represented in forms other than polynomials, particularly where handling those representations are not computationally intensive. Conventionally, transitions between states or motions may be represented via the motion equations. In at least this implementation, the processor-based system advantageously represent the motion or transition as a fitted polynomial function, enhancing the computational performance of an "on-board" processor-based system that is located on-board the primary vehicle and performs the real-time motion planning for the primary vehicle.

For example, to determine the set of fitted polynomial functions the processor-based system may fit a set of polynomials to a motion represented by the trajectory in the form of or which follow a respective set of motion equations that represent a motion of the primary vehicle. For instance, the processor-based system may determine a pair of polynomial functions, one polynomial function of the pair representing a position along the trajectory in a first dimension with respect to time and the other polynomial function of the pair representing a position along the trajectory in a second dimension relative to a time, the second dimension different than the first dimension. Also for example, the processor-based system may determine a pair of time parametric functions that represent the trajectory. For instance, the processor-based system may determine a pair of time parametric quintic functions that represent the trajectory. Also for example, the processor-based system may determine a pair of polynomial functions that are specific to a make and model of the primary vehicle as specified by an original equipment manufacturer of the primary vehicle. Also for example, the processor-based system may further provide the determined a pair of polynomial functions with parameters that are specific to a make and model of the primary vehicle to a processor-based control system of the primary vehicle, where the primary vehicle is an autonomous vehicle.

In certain implementations, the primary agent or vehicle 102 and one or more dynamic obstacles (e.g., other vehicle) may have interdependent trajectories. The trajectories of the dynamic obstacle(s) may be modeled probabilistically (e.g., $X_A$, and $X_B$). For example, dynamic obstacle(s) can react to the movements of both the primary vehicle 102 and all the dynamic obstacles in the environment (including each other), for example in an attempt to avoid collisions or even in an attempt to collide. Accordingly, a behavioral model of each agent is developed which treats vehicle or agent intentions as modeling latent policies or goals, rather than simple trajectories. The latent policies or goals are in a form which can be sampled to determine how the vehicle or agent would react to other trajectories of other vehicles or agents. When the primary vehicle or agent 102 is at a node n at a current time T, the processor-based system seeks to determine where the other vehicles or agents will be in the future. The policies of the other vehicles or agents are first simulated forward until the current time T based on the path of the primary vehicle or agent from a start node to node n and accounting for the probabilistic reactions of the secondary vehicle or agents to the actions of the primary vehicle or agent as well as the actions of all of the secondary vehicles or agents. Thus, the probabilistic function of a given secondary vehicle or agent is representative of the at least some of the actions of the primary vehicle or agent and the secondary vehicles or agents up until a current time. This produces a result indicating the space the other vehicles or agents occupy at the current time T. This is the case because the location of another vehicle or agent at the current time T depends on the trajectory followed by all other vehicles or agents and the primary vehicle or agent 102 up to current time T.

At 806, the processor-based system may provide a set of fitted functions for use in motion planning. For example, in some implementations a processor-based system of a configuration system, for instance implemented by an OEM, may provide the set of fitted functions to a processor-based system of the primary vehicle. For instance, a server at a fixed location, possibly remote from the primary vehicle, may provide the set of fitted functions to a processor-based system that is part of, and moves with, the primary vehicle. Such can be provided wirelessly, or via a wired or optical fiber.

Figure 9:
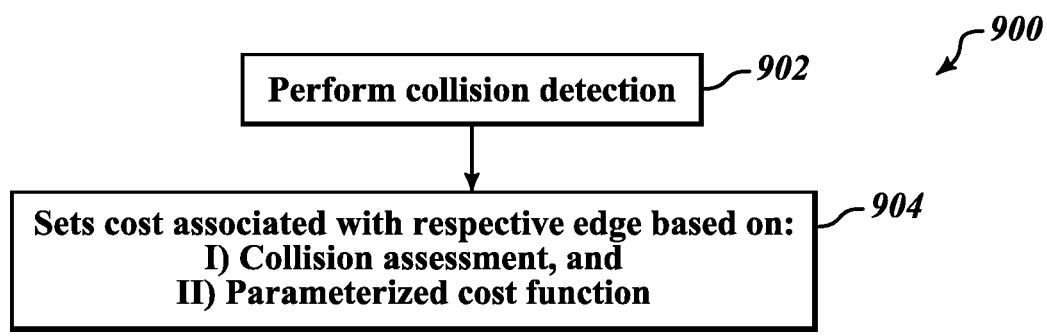
FIG. 9 is a flow diagram a method 900 of operation in a processor-based system to implement motion planning, according to at least one illustrated implementation.

FIG. 9 is a flow diagram showing a method 900 of operation in a processor-based system to implement motion planning, according to at least one illustrated implementation.

The method 900 may, for example, be performed as part of executing any of the methods 600 (FIG. 6), 700 (FIG. 7), and 800 (FIG. 8).

At 902, the processor-based system performs collision detection to determine whether a representation of the primary vehicle will collide with representations of the obstacles in transitioning between a pair of states. The respective states are represented by respective nodes of a pair of nodes that are connected by respective edges of the planning lattice. Performing collision detection may include performing the collision detection via a plurality of distinct hardware circuits, one hardware circuit for each edge of the plurality of edges or via other approaches described herein or in the references incorporated herein by reference.

At 904, the processor-based system sets a cost associated with the respective edge of the planning lattice based at least in part on: i) the collision detection, and ii) a parameterized cost function that represents a severity or ranking of collisions associated with a particular collision. In particular, the parameterized cost function may represent a value associated with at least two or more parameters, for example: an obstacle type, a collision type, and a vehicle speed, or energy that will be dissipated, along with a relative weighting of each type of parameter.

The obstacle type may be representative or indicative of a type of obstacle with which a collision may occur. The collision type may be representative or indicative of a type of collision which may occur. The vehicle speed may be representative or indicative of a speed of at least the primary vehicle immediately prior to (i.e., before a force of collision starts to slow the vehicle or obstacle down) a predicted collision. The energy that will be dissipated is an estimate of energy that will be dissipated as a result of the predicted collision, which may be a function of speed. The parameterized cost function may represent a level of severity of collision based on vehicle speed. Thus, setting a cost associated with the respective edge may advantageously include setting the cost based at least in part on a level of severity based on vehicle speed of at least one or both of the primary vehicle and the obstacle.

The obstacle type may be indicative of whether the obstacle is an animate or inanimate obstacle. Setting a cost associated with the respective edge includes setting the cost based at least in part on whether the obstacle is an animate or inanimate obstacle.

The collision type may be indicative of whether the collision is a collision with a physical obstacle which will result in damage to either the physical obstacle (e.g., another vehicle, a pedestrian) or the primary vehicle or is a collision with an obstacle which will not or may not result in damage to the obstacle (e.g., road marker or courtesy box or other logical spacing construct). Collision type may additionally or alternatively represent a portion of a vehicle that will be impacted (e.g., head on collision, rear collision) or orientation or angle of impact. Setting a cost associated with the respective edge includes setting the cost based at least in part on whether the collision is with a physical obstacle which will result in damage to either the physical obstacle or the primary vehicle or the collision is with a non-physical construct or a physical object which will not or will likely not result in damage to the obstacle or the primary vehicle.

The vehicle speed may be representative or indicative of a speed or velocity of the primary vehicle. The speed may be represented in a real world (e.g., two- or three-dimensional real world reference frame). Setting a cost associated with the respective edge includes setting the cost based at least in part on the speed of the primary vehicle in the real world reference frame. The vehicle speed may be representative or indicative of a speed or velocity of the primary vehicle relative to a speed of the obstacle. Setting a cost associated with the respective edge may include setting the cost based at least in part on the speed of the primary vehicle relative to a speed of the obstacle. The vehicle speed may be representative or indicative of both a speed of the primary vehicle and a speed of the obstacle. Setting a cost associated with the respective edge may include setting the cost based at least in part on the speed of both the primary vehicle and the speed of the obstacle. Energy dissipated may be representative or indicative of an estimate amount of energy that will be dissipated as part of the collision, and typically is a function of speed.

Setting a cost may include assigning or adjusting a cost value associated with each of the edges in the lattice. The cost values may be stored as part of a lattice or as part of a data structure, for example a data structure associated with the lattice or a data structure which implements that lattice.

As discussed above with respect to FIG. 5, each node (e.g., $n_0$, $n_1$, $n_2$ . . . ) in a lattice has an associated value (i.e., cost) based on a cost associated with edges of the lattice (e.g., $c_{0,4}$, $c_{0,5}$, etc.) between the node and the goal (e.g., final state) of the primary agent 102. The costs associated with the edges of the lattice are determined based on, inter alia, a probability of collision, a parametric function that represents severity of collision, and optionally inherent costs associated with movement between two nodes along the edge in question (e.g., fuel and/or energy costs). In implementations, the cost to the goal is determined for each node based on a least-cost path from the node in question to the goal node (e.g., $n_{15}$). The processor-based system determines trajectories t of other agents $A_j$ in the environment 100 of the primary agent. For the current node n, i.e., the current position of the primary agent in the motion planning lattice 500, the processor-based system computes an average cost of each candidate node n' over a set of trajectories S. The state (e.g., pose) of the primary agent 102 in the motion planning lattice 500 moves from node n to a candidate node n' having the lowest average cost. A time step is incremented and the method repeated for the next time step.

It may be useful to compute a cost for each candidate node averaged over a set of known trajectories. To do so, a loop is initiated to consider each trajectory t in the set of trajectories S, for t=1 to m, where m is the number of trajectories. The processor-based system determines which edges of the motion planning lattice 500 collide with trajectory t, if any. The processor-based system applies a cost function to values of the edges which are determined to collide with trajectory t, if any. The processor-based system determines the cost of each candidate node n' based on a least-cost path from node n to the goal going through the respective candidate node n'. An index t identifying the trajectory is incremented and the method repeated until all of the trajectories have been processed.

In some implementations, one or more processor-based systems may perform a method to identify paths for a primary agent 102 via planning lattices, the paths passing through a candidate node having a lowest average cost taking into account a planned path of the primary agent 102 to the goal and the probabilistically-determined paths of other agents (e.g., other autonomous vehicles, other vehicles, people, animals). The processor-based system may perform static background collision detection. The processor-based system may compute a cost to the goal for each node of the motion planning lattice. A model of a behavior of an agent may be provided to the processor-based system as an input, for example at configuration (i.e., pre-runtime). At runtime, the processor-based system may sample the probabilistic model. The probabilistic model may provide a next step $X_j$ for each agent $A_j$ or produce a set of trajectories. The processor-based system may compute a value for each candidate node n' based on a planned path of the primary agent 102 from a current node n to the goal and the probabilistically-determined paths of the other agents. The primary agent 102 moves from its current node n to candidate node n' having the lowest value (i.e., cost). The method may be repeated for the next time step, T=T+1.

The processor-based system may execute a method to compute the value of each candidate node based on a planned path of the primary agent 102 to the goal and the probabilistically-determined paths of other agents. For example, the processor-based system may determine the value of each candidate node n' based on sampled next steps $X_j$ of other agents $A_j$ based on a set of trajectories. The processor-based system may then specify the next planned position of the primary agent 102 based on a move from the current node n to a candidate node n' having the lowest value at time T+1. If the primary agent 102 is not yet at the goal node, then the time is incremented and the method repeated for the next time step.

The processor-based system may execute a method to determine the value of each candidate node n' at a next time step, T+1, based on edge collision costs from sampled next steps $X_j$ of other agents $A_j$ based on a set of probabilistic models S. For example, the processor-based system may initiate an iterative loop based on the number of samples per agent. The processor-based system may initiate an iterative loop based on the number of other agents. The processor-based system may determine the $k^{th}$ sample of the probabilistic next step $X_j$ of an agent $A_j$, based on the set of models S. The processor-based system then determines which edges of the motion planning lattice, if any, collide with the determined probabilistic next step $X_j$ of the agent $A_j$ at time T+1. The processor-based system then applies a cost function to the value of edges, if any, which are determined to collide with the probabilistic next step $X_j$ of agent $A_j$ at time T+1. The iterative loop for the other agents repeats until all of the other agents have been processed. After the iterative loop for the other agents has been completed k times, the iterative loop for samples repeats until all of the samples have been completed, i.e., p times.

As explained above, in implementations, the probabilistic behavioral models of the agents $A_j$ are interdependent, in that the trajectory of each agent $A_j$ is dependent upon the trajectories of all other agents and the primary agent. Therefore, the current and past positions of all of the agents $A_j$ and the primary agent are provided as inputs to the probabilistic behavioral models to determine the predicted next step $X_j$ of each of the agents $A_j$. In doing so, there typically will be some limit on the window or history or look back. Accordingly, the innermost loop of the process is the loop to determine the predicted next step $X_j$ of all of the agents $A_j$ before sampling is repeated. In this way, all of the samples are performed based on the same current position of all of the agents $A_j$ and the primary agent.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs) and/or FPGAs. However, those skilled in the art will recognize that the embodiments disclosed herein, in whole or in part, can be implemented in various different implementations in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as hard disk drives, CD ROMs and computer memory.

The various embodiments described above can be combined to provide further embodiments. All of the US patent application publications, US patent applications, foreign patents, and foreign patent applications referred to in this specification and/or listed in the Application Data Sheet, including but not limited U.S. Patent Application No. 62/616,783, filed Jan. 12, 2018, entitled "APPARATUS, METHOD, AND ARTICLE TO FACILITTE MOTION PLANNING OF AN AUTONOMOUS VEHICLE IN AN ENVIRONMENT HAVING DYNAMIC OBJECTS"; International Patent Application No. PCT/US2017/036880, filed Jun. 9, 2017, entitled "MOTION PLANNING FOR AUTONOMOUS VEHICLES AND RECONFIGURABLE MOTION PLANNING PROCESSORS"; International Patent Application Publication No. WO 2016/122840, filed Jan. 5, 2016, entitled "SPECIALIZED ROBOT MOTION PLANNING HARDWARE AND METHODS OF MAKING AND USING SAME"; U.S. Patent Application No. 62/722,067, filed Aug. 23, 2018, entitled "COLLISION DETECTION USEFUL IN MOTION PLANNING FOR ROBOTICS"; U.S. Patent Application No. 62/775,257, filed Dec. 4, 2018 entitled "APPARATUS, METHOD AND ARTICLE TO FACILITAE MOTION PLANNING IN AN ENVIRONMENT HAVING DYNAMIC OBJECTS"; U.S. Patent Application 62/835,139, filed Apr. 17, 2019, entitled "MOTION PLANNING GRAPH GENERATION USER INTERFACE, SYSTEMS, METHODS AND ARTICLES"; and U.S. Patent Application No. 62/856,548, filed Jun. 3, 2019, entitled "APPARATUS, METHODS AND ARTICLES TO FACILITATE MOTION PLANNING IN ENVIRONMENTS HAVING DYNAMIC OBSTACLES" are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A motion planning method of operation in a processor-based system to perform motion planning via planning lattices, where each planning lattice respectively comprises a plurality of nodes and edges, each node representative of a state of a primary vehicle which operates in an environment that includes one or more other vehicles and other obstacles, and each edge representative of a transition between a respective pair of the nodes, the method comprising:
representing, by the processor-based system, the primary vehicle as a respective oriented bounding box;
representing, by the processor-based system, at least one other obstacle as a representation of a curve in the form of a spline, a b-spline, or a polynomial, and wherein performing oriented bounding box collision detection to determine whether the primary vehicle represented by a respective oriented bounding box collides with other vehicles or other obstacles includes performing oriented bounding box-curve collision detection to determine whether the respective oriented bounding box that represents the primary vehicle will collide with the curve that represents the at least one of the other obstacles in transitioning between the pair of states represented by respective nodes that are connected by the respective edge of the planning lattice;
for at least one of a plurality of the edges of the planning lattice,
performing, by the processor-based system, oriented bounding box collision detection to determine whether the primary vehicle represented by the oriented bounding box will collide with representations of other vehicles or other obstacles in transitioning between a pair of states, the state of the pair represented by respective nodes of a pair of nodes that are connected by the respective edge of the planning lattice; and
setting, by the processor-based system, a cost of the respective edge of a planning lattice to reflect at least one of the detected collision or absence thereof, and further comprising:
performing, by the processor-based system, a least cost analysis of the planning lattice; and
implementing, by the processor-based system, a resultant motion plan by the primary vehicle based at least in part on the least cost analysis.

2. The motion planning method of claim 1 wherein representing at least one other obstacle as a representation of a curve includes representing at least one of a centerline of a road, an edge of a road, or at least one lane marker of a road as spline representation.

3. The motion planning method of claim 1 wherein performing oriented bounding box collision detection includes performing oriented bounding box collision detection via a plurality of distinct hardware circuits.

4. The motion planning method of claim 1 wherein setting a cost of the respective edge of a planning lattice to reflect at least one of the detected collision or absence thereof includes setting the cost of one or more of the respective edges of a planning lattice according to a parameterized cost function to reflect the detection of a collision and to reflect at least one parameter representative of a severity of the detected collision.

5. A motion planning method of operation in a processor-based system to perform motion planning via planning lattices, where each planning lattice respectively comprises a plurality of nodes and edges, each node representative of a state of a primary vehicle which operates in an environment that includes one or more other vehicles and other obstacles, and each edge representative of a transition between a respective pair of the nodes, the method comprising:
  representing, by the processor-based system, the primary vehicle as a respective oriented bounding box; for at least one of a plurality of the edges of the planning lattice,
  performing, by the processor-based system, oriented bounding box collision detection to determine whether the primary vehicle represented by the oriented bounding box will collide with representations of other vehicles or other obstacles in transitioning between a pair of states, the state of the pair represented by respective nodes of a pair of nodes that are connected by the respective edge of the planning lattice; and
  setting, by the processor-based system, a cost of the respective edge of a planning lattice to reflect at least one of the detected collision or absence thereof; and
  wherein performing oriented bounding box collision detection includes performing oriented bounding box collision detection at each of at least one point along a respective trajectory of the primary vehicle using a set of fitted functions to represent the respective trajectory of the primary vehicle corresponding to the respective edge of the planning lattice, and further comprising:
  performing, by the processor-based system, a least cost analysis of the planning lattice; and
  implementing, by the processor-based system, a resultant motion plan by the primary vehicle based at least in part on the least cost analysis.

6. A processor-based system to perform motion planning via planning lattices, where each planning lattice respectively comprises a plurality of nodes and edges, each node representative of a state of a primary vehicle which operates in an environment that includes one or more other vehicles and other obstacles, and each edge representative of a transition between a respective pair of the nodes, the processor-based system comprising:
  at least one processor;
  at least one nontransitory processor-readable medium communicatively coupled to the at least one processor and that stores processor-executable instructions that, when executed by the at least one processor, cause the at least one processor to:
  represent the primary vehicle as a respective oriented bounding box;
  represent at least one other obstacle as a representation of a curve in the form of a spline, a b-spline, or a polynomial, and perform the oriented bounding box collision detection as oriented bounding box-curve collision detection to determine whether the respective oriented bounding box that represents the primary vehicle will collide with the curve that represents the at least one of the other obstacles in transitioning between the pair of states represented by respective nodes that are connected by the respective edge of the planning lattice; and
  for at least one of a plurality of the edges of the planning lattice,
    perform oriented bounding box collision detection to determine whether the primary vehicle represented by the oriented bounding box will collide with representations of other vehicles or other obstacles in transitioning between a pair of states, the state of the pair represented by respective nodes of a pair of nodes that are connected by the respective edge of the planning lattice; and
    set a cost of the respective edge of a planning lattice to reflect at least one of the detected collision or absence thereof;
  perform a least cost analysis of the planning lattice; and
  implement a resultant motion plan by the primary vehicle based at least in part on the least cost analysis.

7. The processor-based system of claim 6 wherein the processor-executable instructions, when executed by the at least one processor, cause the at least one processor to: represent at least one other obstacle as a representation of a curve includes representing at least one of a centerline of a road, an edge of a road, or at least one lane marker of a road as spline representation.

8. The processor-based system of claim 6 wherein performing oriented bounding box collision detection includes performing oriented bounding box collision detection via a plurality of distinct hardware circuits.

9. The processor-based system of claim 6 wherein the processor-executable instructions, when executed by the at least one processor, cause the at least one processor to set the cost of the respective edge of a planning lattice based on a parameterized cost function to reflect the detection of a collision and to reflect a severity of the detected collision.

10. A processor-based system to perform motion planning via planning lattices, where each planning lattice respectively comprises a plurality of nodes and edges, each node representative of a state of a primary vehicle which operates in an environment that includes one or more other vehicles and other obstacles, and each edge representative of a transition between a respective pair of the nodes, the processor-based system comprising:
  at least one processor;
  at least one nontransitory processor-readable medium communicatively coupled to the at least one processor and that stores processor-executable instructions that, when executed by the at least one processor, cause the at least one processor to:
  represent the primary vehicle as a respective oriented bounding box;
  for at least one of a plurality of the edges of the planning lattice,
  perform oriented bounding box collision detection to determine whether the primary vehicle represented by the oriented bounding box will collide with representations of other vehicles or other obstacles in transitioning between a pair of states, the state of the pair represented by respective nodes of a pair of nodes that are connected by the respective edge of the planning lattice; and set a cost of the respective edge of a planning lattice to reflect at least one of the detected collision or absence thereof, wherein the processor-executable instructions, when executed by the at least one processor, cause the at least one processor to perform the oriented bounding box collision detection at each of at least one point along a respective trajectory of the primary vehicle via a set of fitted functions to represent the respective trajectory of the primary vehicle corresponding to the respective edge of the planning lattice;

wherein the processor-executable instructions, when executed by the at least one processor, cause the at least one processor further to:

perform a least cost analysis of the planning lattice; and implement a resultant motion plan by the primary vehicle based at least in part on the least cost analysis.

11. A motion planning method of operation in a processor-based system to perform motion planning via planning lattices, where each planning lattice respectively comprises a plurality of nodes and edges, each node which characterizes a state of a primary vehicle, the primary vehicle which operates in an environment that includes one or more other vehicles and other obstacles, and each edge represents a trajectory of the primary vehicle between states represented by a respective pair of the nodes, the method comprising:

during a runtime, for each of a number of the edges of a planning lattice, representing, by the processor-based system, the trajectory corresponding to the respective edge as a set of fitted functions, performing, by the processor-based system, collision detection using the set of fitted functions to determine whether a representation of the primary vehicle collides with one or more representations of other vehicles or other obstacles; and setting, by the processor-based system, a cost of the respective edge of the planning lattice to reflect at least one of the determined collision or absence thereof in transitioning between a pair of states represented by respective nodes that are connected by the respective edge of the planning lattice.

12. The motion planning method of claim 11, further comprising:

receiving, by the processor-based system, the set of fitted functions at the processor-based system of the primary vehicle from a configuration system located remotely from the primary vehicle, the set of fitted functions which were fitted by the configuration system prior to the runtime.

\* \* \* \* \*